(12) United States Patent
Ozawa

(10) Patent No.: US 9,249,328 B2
(45) Date of Patent: Feb. 2, 2016

(54) INK FOR INK JET RECORDING APPARATUSES AND IMAGE FORMING METHOD

(71) Applicant: KYOCERA DOCUMENT SOLUTIONS INC., Osaka (JP)

(72) Inventor: Noriaki Ozawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 36 days.

(21) Appl. No.: 14/150,540

(22) Filed: Jan. 8, 2014

(65) Prior Publication Data

US 2014/0198150 A1    Jul. 17, 2014

(30) Foreign Application Priority Data

Jan. 11, 2013   (JP) .................................. 2013-003184

(51) Int. Cl.
  C09D 11/00    (2014.01)
  C09D 11/38    (2014.01)
  C09D 11/324   (2014.01)

(52) U.S. Cl.
  CPC .............. *C09D 11/38* (2013.01); *C09D 11/324* (2013.01)

(58) Field of Classification Search
  CPC ........................ C09D 11/00; Y10T 428/24802
  See application file for complete search history.

(56) References Cited

U.S. PATENT DOCUMENTS

| 6,051,057 A | 4/2000 | Yatake et al. |
| 6,790,269 B2* | 9/2004 | Nakatsu et al. ............ 106/31.59 |
| 2005/0024458 A1* | 2/2005 | Sanada et al. ................. 347/100 |
| 2006/0254459 A1* | 11/2006 | Mori et al. ................. 106/31.43 |
| 2011/0205288 A1* | 8/2011 | Matsuyama ......... B41M 5/0023 347/20 |

FOREIGN PATENT DOCUMENTS

| JP | 2005-336496 A | 12/2005 |
| JP | 2011-207146 A | 10/2011 |

* cited by examiner

*Primary Examiner* — Bruce H Hess
*Assistant Examiner* — Sathavaram I Reddy
(74) *Attorney, Agent, or Firm* — Studebaker & Brackett PC

(57) ABSTRACT

An ink for ink jet recording apparatuses contains water and a pigment dispersion containing a resin and carbon black. The ink additionally contains a surfactant including a compound expressed by the general formula (I) below, and the mass average molecular weight of the resin, the DBP oil absorption of the carbon black, the content of the resin with respect to the content of the carbon black in the pigment dispersion, and the dried-by-evaporation viscosity $V_{40}$, which is the viscosity of the ink at the dryness of 40% by mass, are all within the respective predetermined ranges.

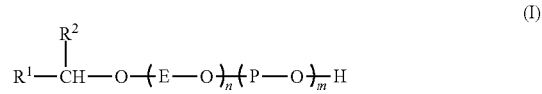

7 Claims, 3 Drawing Sheets

INK FOR INK JET RECORDING APPARATUSES AND IMAGE FORMING METHOD

INCORPORATION BY REFERENCE

The present application claims priority under 35 U.S.C. §119 to Japanese Patent Application No. 2013-003184, filed Jan. 11, 2013. The contents of this application are incorporated herein by reference in their entirety.

BACKGROUND

The present invention relates to an ink for ink jet recording apparatuses and also to an image forming method.

It has been strongly desired for inkjet recording apparatuses to increase the image forming speed without compromising image quality. Unfortunately, when an inkjet recording apparatus performs image forming at a high speed, a recording medium, such as paper, may be passed between a pair of ejection rollers to be ejected before the ink is permeated into the recording medium. Ink adhered to the ejection rollers (offset) may adhere to a recording medium, which may increase the risk of poor imaging.

The risk of poor imaging resulting from the offset may be suppressed by reducing the ejection amount of the ink. However, this arrangement may make it difficult to form images having a desired density. In view of the above, to suppress occurrence of the offset while ensuring formation of images having a desired density, numerous studies have been made on compounds which can be contained in an ink to improve permeability of the ink into a recording medium.

Compounds suggested as having an effect of improving permeability of the ink into a recording medium includes a compound containing straight-chain alkanol to which a specific amount of ethylene oxide and/or propylene oxide is added. Further, an ink containing the compound is also suggested.

SUMMARY

Specifically, the present disclosure provides the following.

A first aspect of the present disclosure relates to an ink for inkjet recording apparatuses.

The ink for inkjet recording apparatuses contains water, a pigment dispersion, and a surfactant that includes a compound expressed by the general formula (I) below.

The pigment dispersion includes a resin and carbon black.

The mass average molecular weight of the resin is from 10,000 to 40,000.

The DBP oil absorption of the carbon black is from 40 g/100 g to 80 g/100 g.

The content of the resin in the pigment dispersion is from 30% by mass to 60% by mass with respect to the content of the carbon black.

The dried-by-evaporation viscosity $V_{40}$ of the ink, which is viscosity of the ink at a dryness of 40% by mass, is 50 mPa·s or less.

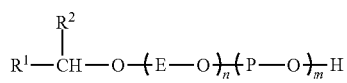

(I)

(In the general formula (I),
$R^1$ represents $C_A H_{2A+1}$,
$R^2$ represents $C_B H_{2B+1}$,
A and B each represents an integer equal to 1 or larger,
A+B represents an integer from 6 to 10,
-E-O— represents $CH_2 CH_2$—O—,
—P—O— represents —$CH_2 CH(CH_3)$—O—,
n and m each represents a positive number,
n+m represents a number from 5 to 11, and
n>m is true.
Note that the repetitive sequence of (-E-O—) and (—P—O—) may be either a random sequence or a block sequence.)

A second aspect of the present disclosure relates to an image forming method. According to this image forming method, an inkjet recording apparatus is used for forming an image by ejecting the ink for inkjet recording apparatuses according to the first embodiment.

DETAILED DESCRIPTION

Figure 1:
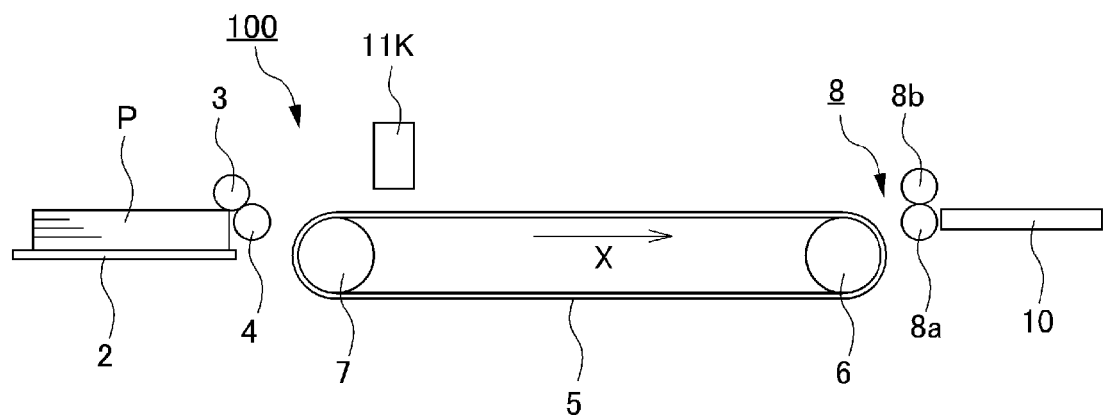
FIG. 1 shows a structure of an inkjet recording apparatus employing a linehead recording type.

The following now describes embodiments of the present disclosure. The present disclosure is in no way limited to the specific embodiments described below, and various modifications may be appropriately made within the scope of the aim of the present disclosure. It should be noted that some overlapping explanations may be omitted. Such omission, however, is not intended to limit the gist of the disclosure.

First Embodiment

An ink for inkjet recording apparatuses (hereinafter may also be referred to simply as an ink) according to a first embodiment of the present disclosure contains water, a pigment dispersion containing a resin and carbon black, and a surfactant including a compound expressed by Formula (I). In addition, the mass average molecular weight of the resin, the DBP oil absorption of the carbon black, the content of the resin relative to the content of the carbon black in the pigment dispersion, and the dried-by-evaporation viscosity $V_{40}$, which is the viscosity of the ink at the dryness of 40% by mass, are all within their predetermined ranges. Preferably, the dynamic surface tension of the ink with the surface lifetime of 10 ms is 50 mN/m or higher.

The ink for inkjet recording apparatuses according to the first embodiment may contain a penetrating agent, a solution stabilizer, and/or a moisturizing agent as needed. The penetrating agent increases permeability of the ink into a recording medium. The solution stabilizer stabilizes the dissolved state of the components of the ink. The moisturizing agent suppresses evaporation of the liquid component from the ink to stabilize the viscosity of the ink. With respect to the ink for ink jet recording apparatuses, the following sequentially describes the dried-by-evaporation viscosity $V_{40}$ of the ink, the dynamic surface tension of the ink, and the respective components of the ink, and a method for manufacturing the ink.

[Dried-by-Evaporation Viscosity $V_{40}$]

The ink for inkjet recording apparatuses according to the present disclosure has a dried-by-evaporation viscosity $V_{40}$, which is the viscosity of the ink at the dryness of 40% by mass, of 50 mPa·s or less. With the dried-by-evaporation viscosity $V_{40}$ of 50 mPa·s or less, the ink is relatively immune to significant change in the viscosity resulting from drying of the ink. Therefore, by the use of an ink having a dried-by-evaporation viscosity $V_{40}$ of 50 mPa·s or less, good ejection of the ink from an inkjet head can be ensured for a long period of time. When $V_{40}$ is too low, it may be difficult to form images having a desired density.

When the dried-by-evaporation viscosity $V_{40}$ exceeds 50 mPa·s, the viscosity of the ink is more likely to increase due to drying of the ink. This often results in non-ejection of the ink from a nozzle portion of an inkjet recording apparatus or in deviation of landing positions of the ink. Further, when the ink thickens, ink droplets landed on a recording medium may spread less on the surface of the recording medium, which makes it difficult to form images having a desired density.

The dried-by-evaporation viscosity $V_{40}$ of the ink can be increased by increasing the content of the ink component (such as a penetrating agent, a solution stabilizer or a moisturizing agent contained in the ink). The dried-by-evaporation viscosity $V_{40}$ of the ink can be decreased by reducing the content of the ink component. The dried-by-evaporation viscosity $V_{40}$ of the ink can be increased by increasing the mass average molecular weight of the resin contained in the pigment dispersion in the ink. The dried-by-evaporation viscosity $V_{40}$ of the ink can be decreased by reducing the mass average molecular weight of the resin. The dried-by-evaporation viscosity $V_{40}$ can be measured by a method such as the following.

<Method for Measuring Dried-by-Evaporation Viscosity>

(Measurement of Dryness by Mass)

About 30 g (W1) of the ink is poured into a cylindrical container having an opening at the top. Next, the container with the ink is placed in a constant temperature bath set at the internal temperature of about 60° C. to measure the mass $W_2$ of the ink in the container at time intervals of an optionally set length. For each measurement of $W_2$, the dryness of the ink by mass is calculated using the following equation.

Dryness by mass (%)=$((W_1-W_2)/W_1)\times100$ (Measurement of Ink Thickening)

The dried-by-evaporation viscosity ($V_{40}$) of the ink is measured when the dryness of the ink reaches 40% by mass. $V_{40}$ is measured at 25° C. by using a viscosity measuring apparatus, such as an oscillation-type viscometer (Viscomate series VM-10A manufactured by Sekonic cooperation).

<<Dynamic Surface Tension>>

For the ink for inkjet recording apparatuses according to the present disclosure, the dynamic surface tension at the surface lifetime of 10 ms is preferably from 34 mN/m to 50 mN/m, and more preferably from 43 mN/m to 55 mN/m.

The dynamic surface tension defined for the ink of the present disclosure refers to the surface tension measured immediately after formation the liquid surface (vapor-liquid interface) and when the liquid surface is in the non-equilibrated state. The surface lifetime refers to the time elapsed after the formation of the liquid surface. With passage of the surface lifetime, the components of the ink diffuse so that the liquid surface approaches to the equilibrium state. As a result, the surface tension decreases. The surface tension when the liquid surface reaches the equilibrium state is defined to be the static surface tension. Therefore, the ink for inkjet recording apparatuses ensures that ink droplets ejected from a recording head land on the recording medium within an extremely short period of time. In view of the above, it is more suitable for the practical situations to define the properties of various inks in terms of the dynamic surface tension of the inks. The present application incorporates by reference the entire contents of Japanese Patent Application Laid-Open Publication No. 2011-207146, filed Mar. 30, 2010.

In an ink with a high dynamic surface tension, the surfactant tends to migrate relatively slowly and thus is more likely to be maintained in the dispersed state. In short, when the dynamic surface tension of the ink is high, it is less likely that the surfactant in the ink migrates to the liquid surface within a short period of time. For this reason, use of an ink with a high dynamic surface tension renders it easier to suppress instability of image formation resulting from localization of the surfactant in the ink. On the other hand, an ink with a high dynamic surface tension may not have good permeability into a recording medium, so that use of such an ink may lead to difficulty in suppressing blotches on prints resulting from offset.

In an ink with a low dynamic surface tension, the surfactant tends to migrate quickly and thus is less likely to be maintained in the dispersed state. In short, when the dynamic surface tension of an ink is low, it is more likely that the surfactant in the ink migrates to the liquid surface within a short period of time. For this reason, when an ink having a low dynamic surface tension is used, the permeability of the ink to a recording medium may be high, but the ink may excessively permeate into the recording medium. When an ink having a low dynamic surface tension is used, the pigment contained in the ink permeates into a recording medium along with water and the organic solvent contained in the ink. It is therefore difficult to form images having a desired density. Further, when an ink having an excessively low dynamic surface tension is used, ink droplets ejected out of the inkjet head may break up before landing the recording medium due to the localization of the surfactant in the ink. This may lead to occurrence of instability of image formation (occurrence of satellites). The dynamic surface tension of an ink can be measured by a method such as the following.

<Method for Measuring Dynamic Surface Tension>

The method for measuring the dynamic surface tension of an ink is not specifically limited, and a method employing a conventional dynamic surface tensiometer can be used. Examples of the dynamic surface tensiometer include a measuring device such as a bubble pressure dynamic surface tensiometer (BP100 manufactured by KRUSS).

[Water]

The ink for inkjet recording apparatuses according to the present disclosure is a water-based ink and thus essentially contains water. The water contained in the ink is appropriately selectable from among any types of water conventionally used in manufacturing water-based inks in view of the desired purity. The water content of the ink for inkjet recording apparatuses according to the present disclosure may be appropriately adjusted in accordance with the respective amounts of the components used, other than water (other components). A typical content of water in the ink according to the present disclosure is preferably from 20% by mass to 70% by mass with respect to the total mass of the ink, and more preferably from 25% by mass to 60% by mass.

[Pigment Dispersion]

The ink for inkjet recording apparatuses according to the present disclosure contains a pigment dispersion. The pigment dispersion includes a resin and also includes carbon black as the pigment. The mass average molecular weight of the resin is from 10,000 to 40,000. The di-butyl-phthalate (DBP) oil absorption of the carbon black is from 40 g/100 g to 80 g/100 g. The following sequentially describes the resin, the carbon black, and the methods for manufacturing pigment dispersion.

(Resin)

Examples of the resin contained in the pigment dispersion include a styrene-acrylate-alkyl acrylate ester copolymer, a styrene-methacrylate-methacrylic alkyl ester-alkyl acrylate ester copolymer, a styrene-acrylate copolymer, a styrene-maleate copolymer, a styrene-maleate-alkyl acrylate ester copolymer, a styrene-methacrylate copolymer, a styrene-methacrylic alkyl ester copolymer, a styrene-maleate half-ester copolymer, a vinylnaphthalene-acrylate copolymer, and a vinylnaphthalene-maleate copolymer. Of these resins, it is preferable to use a styrene acrylic resin containing a unit derived from styrene and a unit derived from acrylic acid, methacrylic acid, an acrylic acid ester, or a methacrylic acid ester (for example, a styrene-acrylate-alkyl acrylate ester copolymer, a styrene-methacrylate-methacrylic alkyl ester-alkyl acrylate ester copolymer, a styrene-acrylate copolymer, a styrene-maleate-alkyl acrylate ester copolymer, a styrene-methacrylate copolymer, or a styrene-methacrylic alkyl ester copolymer) because such a resin allows easy preparation and exhibits excellent effect of dispersing the pigment.

The mass average molecular weight (Mw) of the resin contained in the pigment dispersion is from 10,000 to 40,000. With the mass average molecular weight of the resin being from 10,000 to 40,000, good ejection of the ink from an inkjet head can be ensured for a long period of time while ensuring forming an image with a desired density. The mass average molecular weight (Mw) of the resin contained in the pigment dispersion can be measured by using gel filtration chromatography.

When the ink used contains a pigment dispersion prepared by using a resin having an excessively low mass average molecular weight, the wettability of the ink to a recording medium may be excessively high. When the wettability of the ink to a recording medium is excessively high, the pigment particles may not stay on the recording medium, making it difficult to form images having a desired density. With the ink used contains a pigment dispersion prepared by using a resin having an excessively high mass average molecular weight, the viscosity of the ink tends to increase as the ink dries. Therefore, it may be difficult to ensure good injection of the ink from an inkjet head for a long period of time.

A publically known method can be used to adjust the amount of use of the polymerization initiator (radical polymerization initiator), the polymerization temperature, or the polymerization time for causing a polymerization reaction to yield the resin, thereby to adjust the molecular weight of the resin. To adjust the molecular weight of the resin, it is preferable to add the radical polymerization initiator in an amount from 0.001 mol to 5 mol with respect to 1 mol of a monomer mixture, and more preferably in an amount from 0.01 mol to 2 mol. However, reducing the amount of the polymerization initiator may stop the polymerization reaction of the reactant, leading to an increase in residual monomers. Further, a minute amount of 2-mercaptoethanol (for example, 0.001 mol or less with respect to 1 mol of the monomer mixture) may be added as a chain transfer agent, together with the polymerization initiator.

Preferably, the polymerization temperature is adjusted to fall in a range of 50° C. to 70° C., and the polymerization time is adjusted to fall in a range of 10 hours to 24 hours.

The acid value of the resin contained in the pigment dispersion is preferably from 50 mgKOH/g to 300 mgKOH/g. When a resin having an excessively low acid value is used to prepare the pigment dispersion, it may be difficult to ensure that the pigment is divided into fine particles of a desired size and dispersed well in the pigment dispersion. For this reason, when the ink used contains a pigment dispersion prepared by using a resin having an excessively low acid value, there may be a case where images cannot be formed to achieve favorable colorability or color formability. When an ink contains a pigment dispersion prepared by using a resin having an excessively high acid value, the ink may not achieve superior preservation stability. The acid value of the resin can be adjusted by appropriately adjusting the amount of use of monomers having an acidic functional group, such as acrylic acid or methacrylic acid, in synthesis of the resin. In particular, the amount of use of monomers having an acidic functional group can be increased to increase the acid value.

The content of the resin in the pigment dispersion is from 30% by mass to 60% by mass with respect to the carbon black, which will be described later, and more preferably from 30% to 50% with respect to the carbon black. When the ink used contains the pigment dispersion that in turn contains the resin in an amount from 30% by mass to 60% by mass, preferable ejection of the ink from an inkjet head can be ensured for a long period of time while ensuring formation of images having a desired density.

When the content of the resin in the pigment dispersion is excessively low, it may be difficult to disperse the carbon black well in the ink. Thus, when an ink prepared by using the pigment dispersion having an excessively low resin content is used, it may be difficult to form images having a desired density. When an ink prepared by using the pigment dispersion having an excessively high resin content is used, the viscosity of the ink tends to increase as the ink dries. Therefore, good ejection of the ink from an inkjet head may not be ensured for a long period of time.

(Carbon Black)

The pigment dispersion contains, as a colorant, carbon black which is a pigment. The carbon black used is one having a DBP oil absorption from 40 g/100 g to 80 g/100 g. When the ink used is prepared by using the pigment dispersion containing carbon black having a DBP oil absorption from 40 g/100 g to 80 g/100 g, good ejection of the ink from an inkjet head can be ensured for a long period of time while ensuring formation of images having a desired density.

When the DBP oil absorption of the carbon black is too low, the carbon black may not sufficiently absorb the resin, which may make it difficult to disperse the carbon black into the pigment dispersion to a desired extent. For this reason, when the ink used is prepared by using the pigment dispersion contains the carbon black whose DBP oil absorption is too low, it may be difficult to form images having a desired density. When the DBP oil absorption of the carbon black is too high, the carbon black may adsorb the resin too strongly, which may increase the viscosity of the ink. Therefore, when the ink used is prepared by using the pigment dispersion containing carbon black having an excessively high DBP oil absorption, it may be difficult to favorably eject the ink from an inkjet head for a long period of time. The DBP oil absorption of the carbon black can be measured according to the ASTM D2414-79 standard.

The amount of the carbon black is preferably from 4% by mass to 8% by mass with respect to the total mass of the ink. With an ink containing an excessively small amount of carbon black, it may be difficult to ensure images to be formed having a desired density. When the ink used contains an excessively high content of the carbon black, the fluidity of the ink may be too low. This may result in that images having a desired density are not be formed, the ink is not permeated well into a recording medium, and image failure occurs due to offset.

The mean volume diameter of the carbon black contained in the pigment dispersion preferably is from 30 nm to 200 nm, and more preferably from 70 nm to 130 nm from the standpoint of ink density or ink stability. The mean volume diameter of the pigment can be adjusted by adjusting the particle size of beads used in kneading the resin with the pigment or by adjusting the processing time (dispersion time).

(Method for Manufacturing Pigment Dispersion)

Examples of a preferable method for manufacturing a pigment dispersion containing carbon black and a resin include a method in which the pigment and the resin are kneaded in an appropriate aqueous medium (water, for example) into a pigment dispersion using a media-type wet disperser (for example, Nano Grain Mill manufactured by Asada Iron Works Co., Ltd., MSC Mill manufactured by Mitsui Kozan Co., Ltd, or Dyno Mill manufactured by Shinmaru Enterprises Corporation). The processing performed using the media-type wet disperser may use beads of a small particle size. The particle size of the beads is not specifically limited, and a particle size from 0.5 mm to 1.0 mm is typically preferable. The material of the beads is not specifically limited, and a hard material such as zirconia is preferable.

The amount of the aqueous medium used in manufacturing the pigment dispersion is preferably one to ten times the total mass of the carbon black and the resin, and more preferably two to eight times.

[Surfactant]

An ink for inkjet recording apparatuses according to the present disclosure contains a surfactant including a compound expressed by the general formula (I) below. As the surfactant, two or more compounds each expressed by the general formula (I) below may be used in combination.

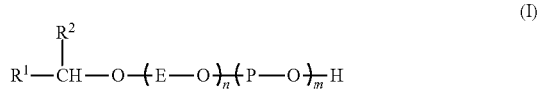

(I)

(In the general formula (I),
$R^1$ represents $C_AH_{2A+1}$,
$R^2$ represents $C_BH_{2B+1}$,
A and B each represents an integer equal to 1 or larger,
A+B represents an integer from 6 to 10,
-E-O— represents $CH_2CH_2$—O—,
—P—O— represents —$CH_2CH(CH_3)$—O—,
n and m each represents a positive number,
n+m represents a number from 5 to 11, and
n>m is satisfied.

Note that the repetitive sequence of (-E-O—) and (—P—O—) may be either a random sequence or a block sequence.)

The presence of the surfactant including a compound expressed by the general formula (I) in the ink improves the wettability of the ink to a recording medium, which ensures good permeation of the ink into a recording medium. The ink according to the first embodiment permeates well into a recording medium. Therefore, use of the ink according to the first embodiment ensures good ejection of the ink from an inkjet head for a long period of time, while ensuring formation of images having a desired density.

In the general formula (I), A+B represents an integer from 6 to 10. When the surfactant used includes a compound expressed by the general formula (I) where A+B represents an integer less than 6, the resulting ink is not likely to exhibit excellent wettability to a recording medium. For this reason, when the ink used contains a compound expressed by the general formula (I) where A+B represents less than 6, the ink is hard to spread on a recording medium and images having a desired density are not likely to be formed. When an ink used contains a compound expressed by the general formula (I) where A+B represents an integer larger than 10, the viscosity of the ink may increase excessively as the solvent of the ink evaporates. For this reason, when an ink used contains a compound expressed by the general formula (I) where A+B represents an integer larger than 10, droplets of the ink ejected onto a recording medium may not spread appropriately on the surface of the recording medium, which may make it difficult to obtain images having a desired density. Further, the viscosity of such an ink tends to increase excessively and thus good ejection of the ink from an inkjet head may not be ensured.

On condition that A+B represents an integer from 6 to 10, A and B each preferably is from 2 to 8, and more preferably from 3 to 5.

In the general formula (I), n+m represents a number from 5 to 11. When the surfactant used includes a compound expressed by the general formula (I) where n+m is an integer less than 5, the resulting ink may not exhibit excellent wettability to a recording medium. For this reason, when the ink used contains a compound expressed by the general formula (I) where n+m represents a number less than 5, droplets of the ink may not spread appropriately on the surface of a recording medium, which may makes it difficult to form images having a desired density. When the ink used contains a compound expressed by the general formula (I) where n+m represents a number larger than 11, the viscosity of the ink tends to increase excessively, which may make it difficult to ensure good ejection of the ink from an inkjet head.

On condition that n+m represents a number from 5 to 11 and that m<n is satisfied, n is preferably a number from 4 to 9, and more preferably a number from 5 to 7. In addition, m is preferably a number from 1 to 4 and more preferably a number 2 or 3.

When the surfactant used includes a compound expressed by the general formula (I) where n≤m, the wettability of the resulting ink to a recording medium may be too high. When the wettability of the ink to a recording medium is too high, the pigment contained in the ink permeates into the recording medium together with water and an organic solvent contained in the ink. It is therefore difficult to form images having a desired density.

The content of the surfactant in the ink is preferably from 0.05% by mass to 0.5% by mass with respect to the total mass of the ink. When the ink used contains an excessively small amount of the surfactant, the wettability of the ink to a recording medium may be insufficient, so that occurrence of offset is more likely. Due to the offset, it may be difficult to form images having a desired density. When the ink used contains an excessively large amount of the surfactant, the wettability of the ink to a recording medium may be too high. When the wettability of the ink to a recording medium is too high, the pigment contained in the ink permeates into the recording medium together with water and an organic solvent contained in the ink. Therefore, it may be difficult to form an image having a desired density.

The method for manufacturing a compound expressed in the general formula (I) is not specifically limited. For example, a compound expressed by the general formula (I) can be manufactured by adding ethylene oxide and propylene oxide in a conventional manner to the hydroxyl group of the alcohol expressed by a general formula (II) shown below.

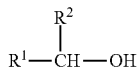

(II)

[Penetrating Agent]

The ink for inkjet recording apparatuses according to the first embodiment of the present disclosure may contain a penetrating agent. The penetrating agent is a component for increasing the permeability of the ink into a recording medium. Specific examples of the penetrating agent include: diols, such as 1,2-hexylene glycol, 1,2-octanediol, 2,4-diethyl-1,5-pentanediol, and 2-butyl-2-ethyl-1,3-propanediol; and glycol ethers, such as triethylene glycol monobutyl ether, and diethylene glycol monobutyl ether. Two or more penetrating agents may be used in combination. When the ink contains a penetrating agent, the content of the penetrating agent is appropriately adjusted depending on the type of the penetrating agent used. The typical content of a penetrating agent is preferably from 0.5% by mass to 20% by mass with respect to the total mass of the ink.

[Solution Stabilizer]

The ink for inkjet recording apparatuses according to the first embodiment of the present disclosure may contain a solution stabilizer. The solution stabilizer is a component for compatibilizing the components of the ink to stabilize them in the dissolved state. Specific examples of the solution stabilizer include 2-pyrrolidone, N-methyl-2-pyrrolidone, and γ-butyrolactone. Two or more solution stabilizers may be used in combination. When the ink contains a solution stabilizer, the content of the solution stabilizer is preferably from 1% by mass to 20% by mass, and more preferably from 3% by mass to 15% by mass with respect to the total mass of the ink.

[Moisturizing Agent]

The ink for inkjet recording apparatuses according to the first embodiment of the present disclosure may contain a moisturizing agent. The moisturizing agent is a component for suppressing evaporation of the liquid from the ink to stabilize the viscosity of the ink. Specific examples of the moisturizing agent include: polyalkylene glycols, such as polyethylene glycol and polypropylene glycol; alkylene glycols, such as ethylene glycol, propylene glycol, butylene glycol, diethylene glycol, dipropylene glycol, triethylene glycol, tripropylene glycol, 1,2,6-hexanetriol, thiodiglycol, 1,3-butanediol, and 1,5-pentanediol; and glycerin. Among these moisturizing agents, glycerin is more preferable for its superior effect of suppressing evaporation of the liquid component, such as water. Two or more moisturizing agents may be used in combination. When the ink contains a moisturizing agent, the content of the moisturizing agent is preferably from 2% by mass to 30% by mass, and more preferably from 10% by mass to 25% by mass with respect to the total mass of the ink.

[Method for Manufacturing Ink for Inkjet Recording Apparatuses]

The method for manufacturing the ink for inkjet recording apparatuses according to the first embodiment of the present disclosure is not specifically limited, as long as water, the pigment dispersion, and the surfactant includes a compound expressed in the formula (I) are uniformly mixed after adding a penetrating agent, a solution stabilizer, and/or a moisturizing agent as needed. Specific examples of the manufacturing method for the ink for inkjet recording apparatuses include a method in which the components of the ink are uniformly mixed by a mixer, followed by removing foreign matter or coarse particles by using a filter having a pore size of 10 μm or smaller. In the manufacture of the ink for inkjet recording apparatuses, various additives which are contained in a conventional ink for inkjet recording apparatuses may be added as needed, in addition to water, the pigment dispersion, the moisturizing agent, the penetrating agent, and the surfactant includes a compound expressed by the formula (I). Examples of such additives include: a liquid component other than an organic solvent typified by a solution stabilizer; an antioxidant; a viscosity modifier; a pH modifier; and an antiseptic and fungicide agent. The ink according to the first embodiment may additionally contain a surfactant having a structure other than that expressed by the formula (I) in an amount not obstructing the object of the present disclosure.

The ink for inkjet recording apparatuses according to the first embodiment described above can ensure good ejection of the ink from an inkjet head for a long period of time and also ensure formation of images having a desired density. Thus, the ink for inkjet recording apparatuses according to the first embodiment can be used favorably in various inkjet recording apparatuses.

Second Embodiment

A second embodiment relates an image forming method. This image forming method is to form an image with the use of an inkjet recording apparatus by ejecting the ink according to the first embodiment. A recording type of the inkjet recording apparatus employed in the image forming method according to the second embodiment is not specially limited, and a serial type (in which the recording head is moved relatively to a recording medium while being scanned to perform the recording) or a linehead type (in which the recording head fixed to the base body of the recording apparatus is used to perform the recording) may be employed. As an inkjet recording apparatus usable in the image forming method according to the second embodiment, a recording apparatus equipped with a linehead recording head is preferable for its high-speed image forming capability. More preferable is a recording apparatus having a linehead elongated in a direction perpendicular to the conveyance direction of a recording medium.

Figure 2:
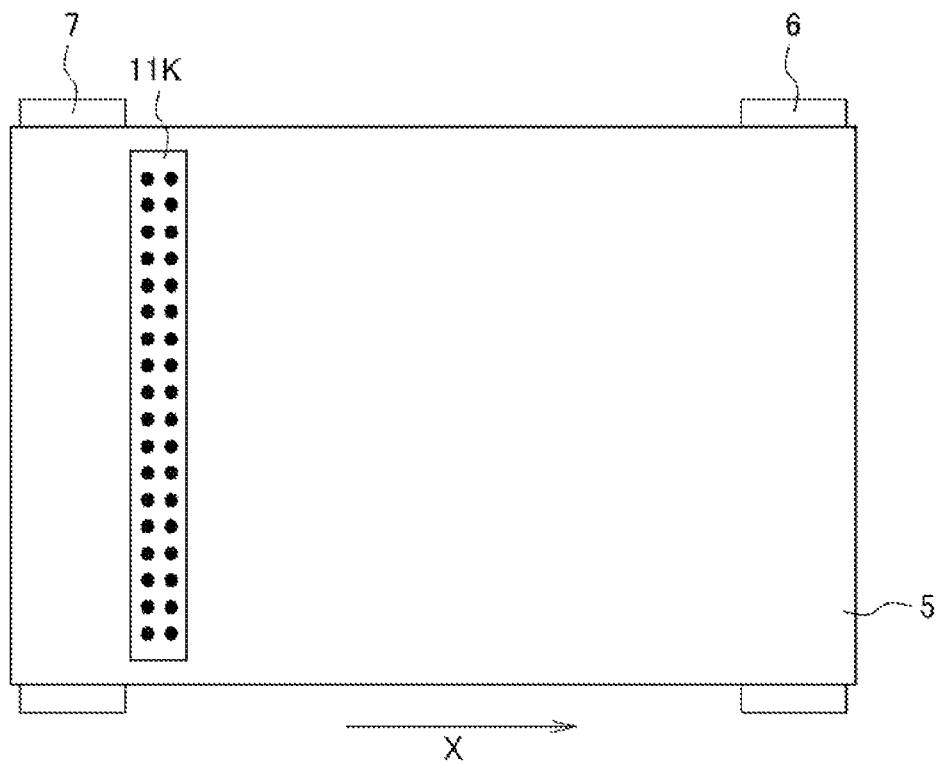
FIG. 2 shows a conveyance belt of the inkjet recording apparatus shown in FIG. 1 as seen from the top.

The following describes the image forming method according to the second embodiment, with reference to the drawings. In particular, the following describes a method in which an inkjet recording apparatus of a linehead recording type is used to form an image on recording paper P as the recording medium. FIG. 1 shows a structure of an inkjet recording apparatus of a linehead recording type. FIG. 2 shows a conveyance belt of the inkjet recording apparatus shown in FIG. 1, as seen from the top.

As shown in FIG. 1, an inkjet recording apparatus 100 is provided with a paper feed tray 2 (paper feeder) at the left thereof. The paper feed tray 2 is for accommodating recording paper P. At one edge of the paper feed tray 2, a paper feed roller 3 and a driven roller 4 are provided. The paper feed roller 3 feeds the recording paper P accommodated in the paper feed tray 2 to a conveyance belt 5 (which will be described later) sheet by sheet starting from the topmost one. The driven roller 4 is brought into pressure contact with the paper feed roller 3 and thus is driven to rotate.

At the downstream side of the paper feed roller 3 and the driven roller 4 in the paper conveyance direction X (the right-hand side of FIG. 1), a conveyance belt 5 is disposed to be freely rotatable. The conveyance belt 5 is wound around a belt drive roller 6 and a belt roller 7. The belt drive roller 6 is disposed at the downstream side in the paper conveyance direction X. The belt roller 7 is disposed at the upstream side in the paper conveyance direction X and is driven to rotate by the drive roller 6 via the conveyance belt 5. By the clockwise rotation of the belt drive roller 6, the recording paper P placed on the conveyance belt 5 is conveyed in the paper conveyance direction X.

Since the belt drive roller 6 is disposed at the downstream side in the paper conveyance direction X, a portion of the conveyance belt 5 running along the paper-feed side (upper side in the FIG. 1) is pulled by the belt drive roller 6. This arrangement allows the belt to be pulled without looseness, which enables stable conveyance of the recording paper P. The conveyance belt 5 is made with a dielectric resin sheet and preferably configured integrally (i.e., seamless).

The inkjet recording apparatus 100 may additionally include a heating section (not shown) for heating the recording medium with the aim of accelerating drying of the ink. Yet, the second embodiment employs the ink according to the first embodiment, which has an excellent permeability into a recording medium. It is thus ensured that the ink promptly dries on a recording medium without having to heat the recording medium, so that favorable images can be formed. For this reason, the inkjet recording apparatus 100 may be without the heating section.

An ejection roller pair 8 (ejection section) is disposed at the downstream side of the conveyance belt 5 in the paper conveyance direction X. The ejection roller pair 8 is made up of an ejection roller 8*a* and a driven roller 8*b*. The ejection roller 8*a* rotates clockwise in the figure to eject the recording paper P on which an image is recorded to the outside of the base body of the recording apparatus. The driven roller 8*b* is pressed against the upper portion of the ejection roller 8*a* so as to be driven to rotate by the ejection roller 8*a*. A paper output tray 10 is disposed at the downstream side of the ejection roller pair 8 in the paper conveyance direction X. The paper output tray 10 stores the recording paper P ejected out of the base body of the recording apparatus.

The driven roller 8*b* makes a direct contact with the surface, on which image is formed, of the recording paper P. For this reason, the surface of the driven roller 8*b* is preferably made of a water-repellent material. Forming the surface of the driven roller 8*b* with a water-repellent material reduces adhesion of the ink, which is not permeated into the recording paper P, to the driven roller 8*b*. This helps to suppress occurrence of offset. Examples of a favorable water-repellent material include fluororesins (such as a polytetrafluoroethylene (PTFE), a tetrafluoroetylene-perfluoroalkylvinylether copolymer, a tetrafluoroethylene-hexafluoropropylene copolymer, a tetrafluoroethylene-ethylene copolymer, a tetrafluoroethylene-vinylidene fluoride copolymer, a tetrafluoroethylene-hexafluoropropylene-perfluoroalkylvinyl ether copolymer, a polychlorotrifluoroethylene, a chlorotrifluoroethylene-ethylene copolymer, a chlorotrifluoroethylene-vinylidene fluoride copolymer, a polyvinylidene fluoride, and a polyvinyl fluoride). Similarly to the driven roller 8*b*, it is preferable to use a water-repellent material for forming the surface of a member that makes contact with the surface, on which an image is formed, of the recording paper P.

Disposed above the conveyance belt 5 is a linehead 11K. The linehead 11K is held at a height with a predetermined spacing from the top surface of the conveyance belt 5 and records an image on the recording paper P conveyed on the conveyance belt 5. The linehead 11K is filled with a black color ink. A monochrome image is formed on the recording paper P by ejecting the black color ink from the linehead 11K.

Preferably, it should take one second or less from the time at which droplets of the ink ejected from the linehead 11K lands a portion of the recording paper P to the time at which the portion reaches the ejection section 8 to achieve the size reduction of the recording apparatus. Although this time period is within one second, use of the ink according to the first embodiment achieves a sufficient effect of suppressing occurrence of offset at the time of high-speed image forming The amount of the ink ejected from the linehead 11K to the recording paper P and lands the recording paper P is not specifically limited. The amount of the ink is adjusted so as to form an image with a desired density while suppressing occurrence of offset.

The linehead 11K includes a plurality of nozzle arrays as shown in FIG. 2. Each nozzle array includes a plurality of nozzles arranged in a row along a direction perpendicular to the conveyance direction of the recording paper P (i.e., along the vertical direction of FIG. 2). The linehead 11K has a recording region at least equal to the width of the recording paper P conveyed and can simultaneously form one line of an image on the recording paper P being conveyed on the conveyance belt 5.

The inkjet recording apparatus employed in the linehead recording method according to the present embodiment has a linehead that includes a plurality of nozzles disposed in one or more arrays along the longitudinal direction of the base body of a head and the length of each array measures at least equal to the width of the conveyance belt 5. With this configuration, the inkjet recording apparatus has a recording region at least equal to the width of the recording paper P. Alternatively, a plurality of short-length head units each including a plurality of nozzles may be disposed linearly in the width direction of the conveyance belt 5 to constitute a linehead capable of recording an image over the entire width of the recording paper P conveyed.

Further, the linehead 11K may employ any of various ink ejection schemes. Examples of the ink ejection scheme include a piezoelectric element scheme (of ejecting ink droplets under the pressure produced in a liquid chamber of the linehead 11K with the use of a piezoelectric element, not shown in the figures) or a thermal ink-jet scheme (of ejecting ink droplets by applying pressure produced by bubbles formed in the ink with the use of a heating element). A preferable ink ejection scheme is the piezoelectric element scheme because the scheme allows easy control of the ejection amount.

Figure 3:
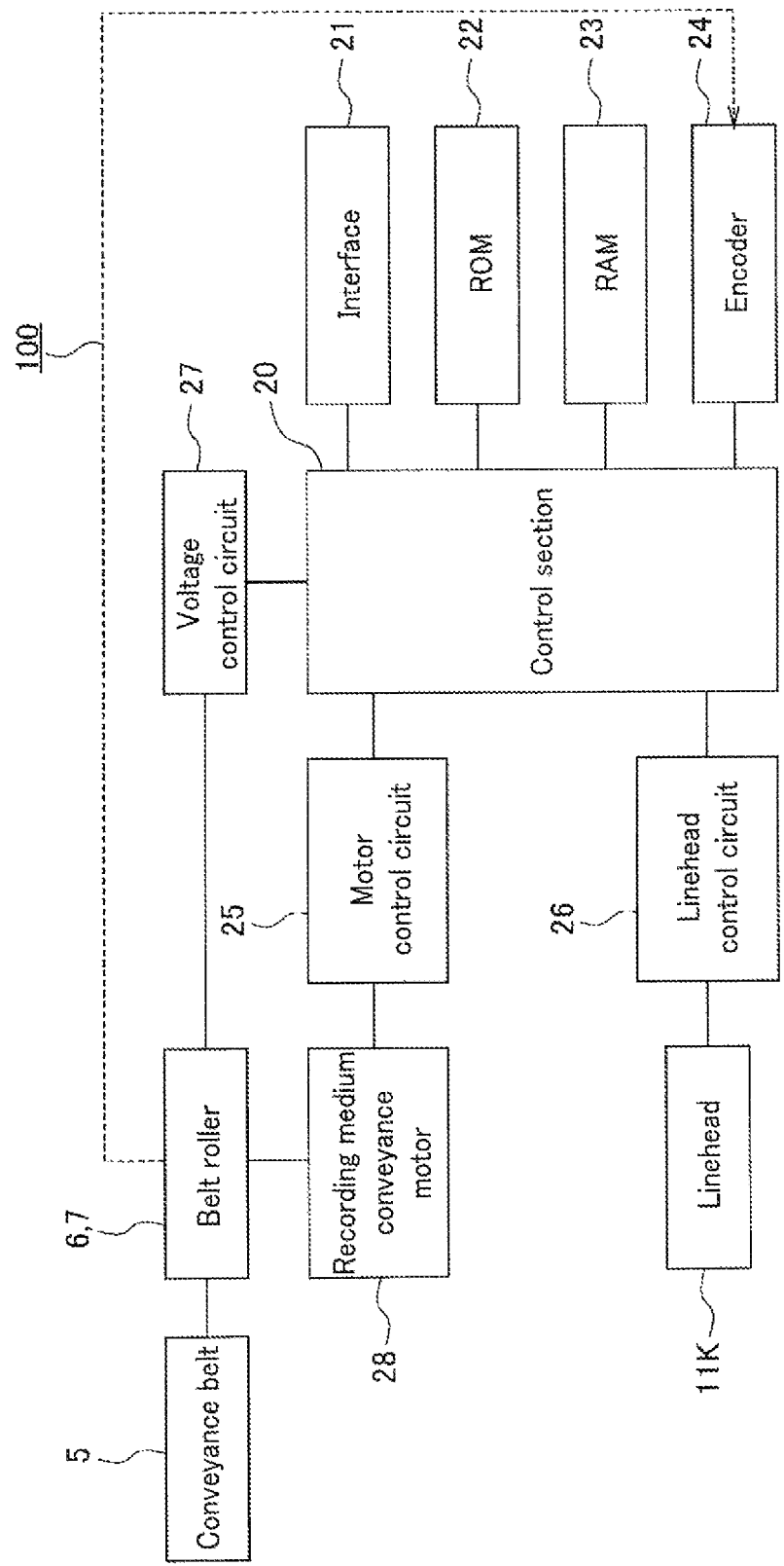
FIG. 3 is a block diagram showing a structure of the inkjet recording apparatus employing the linehead recording system.

FIG. 3 is a block diagram showing a structure of the inkjet recording apparatus of a linehead recording type. FIG. 3 designates the components that are commonly shown in FIGS. 1 and 2 with the same reference signs, and a description thereof is omitted. The inkjet recording apparatus 100 includes a control section 20. The control section 20 is connected to electric circuits (for example, an interface 21, ROM 22, RAM 23, an encoder 24, a motor control circuit 25, a linehead control circuit 26, and a voltage control circuit 27).

The interface 21 transmits data to and receives data from a host apparatus (for example, a personal computer, which is not shown). The control section 20 conducts scaling processing or grayscale processing on an image signal received via the interface 21 to convert the signal into image data. Further, the control section 20 outputs control signals to the respective control circuits, which will be described later.

The ROM 22 stores a program (for example, a control program for driving the linehead 11K to carry out image recording). The RAM 23 stores image data resulting from the scaling processing or the grayscale processing executed by the control section 20 into a predetermined region.

The encoder 24 is connected to the belt drive roller 6 that is located at the paper ejecting side to drive the conveyance belt 5. The encoder 24 outputs a sequence of pluses according to the amount of rotational displacement of the rotational axis of the belt drive roller 6. The control section 20 calculates the amount of rotation by counting the number of pulses transmitted from the encoder 24 to determine the paper feed amount (paper position). The control section 20 outputs control signals to the motor control circuit 25 and the linehead control circuit 26 based on the signal from the encoder 24.

The motor control circuit 25 drives a recording medium conveyance motor 28 according to the signal output from the control section 20. The recording medium conveyance motor 28 rotates the belt drive roller 6 to run the conveyance belt 5 clockwise in FIG. 1 so that the paper is conveyed in the paper conveyance direction X.

The linehead control circuit 26 transfers the image data stored in the RAM 23 to the linehead 11K and controls ejection of the ink from the linehead 11K based on the transferred image data, based on the signal output from the control section 20. Under the control as described above and the paper conveyance control executed with the use of the conveyance belt 5 driven by the recording medium conveyance motor 28, an image is formed on the paper.

The voltage control circuit 27 generates an alternating electric field by applying voltage across the belt roller 7, which is located on the paper-feed side, based on the signal output from the control section 20. This causes the paper to electrostatically adhere to the conveyance belt 5. The electrostatic adherence is released by grounding the belt roller 7 or the belt drive roller 6 based on the signal output from the control section 20. This embodiment is structured to apply voltage across the belt roller 7, which is located at the paper-feed side. In an alternative structure, voltage may be applied across the belt drive roller 6, which is located at the paper-discharge side.

Figure 4:
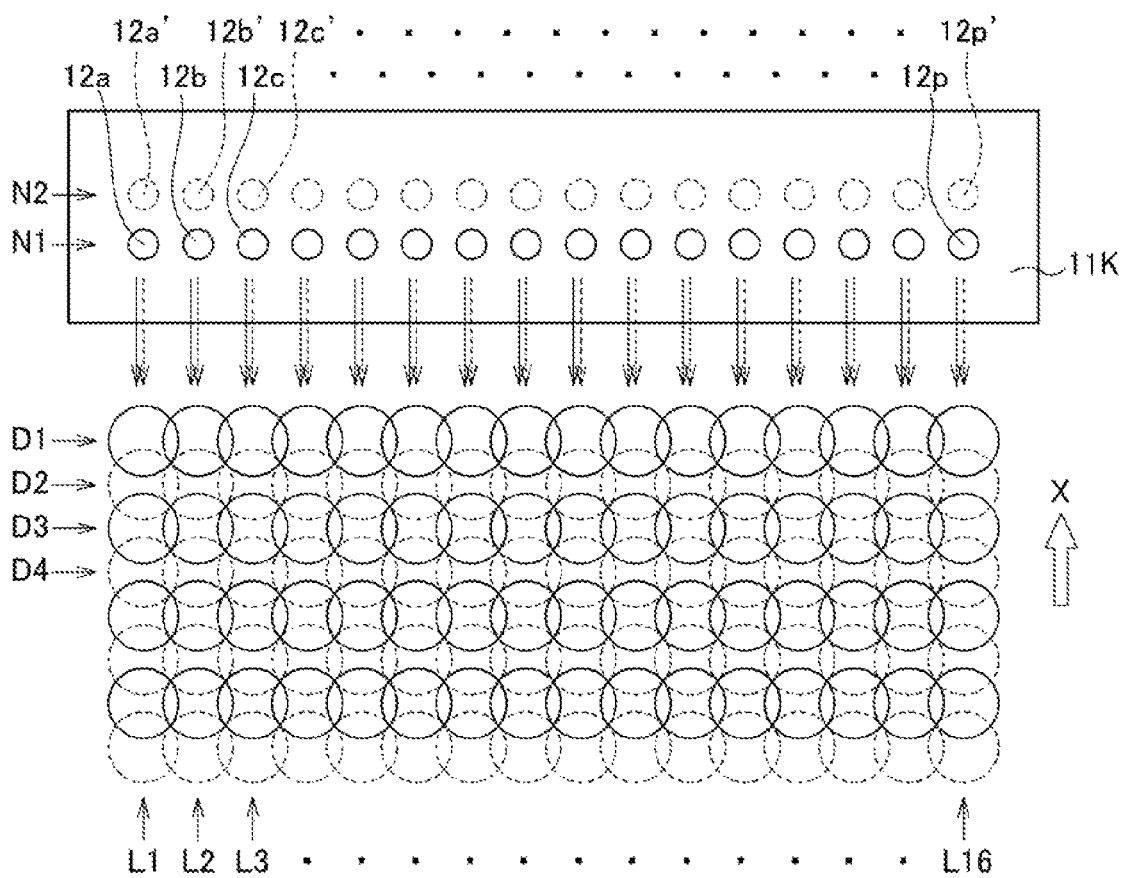
FIG. 4 shows a linehead included in the inkjet recording apparatus employing the linehead recording type and part of dot lines formed on recording paper.

The following specifically describes a method for forming dots by the inkjet recording apparatus of the linehead recording type, with reference to FIG. 4.

As shown in FIG. 4, the linehead 11K includes nozzle arrays N1 and N2 each including a plurality of nozzles, and the arrays N1 and N2 are disposed in parallel to each other in the direction in which the recording paper P is conveyed (the paper conveyance direction X). More specifically, for forming one dot line along the conveyance direction of the recording paper P, the respective nozzle arrays N1 and N2 each include one nozzle (nozzle 12a and 12a' for forming a dot line L1). That is, two nozzles are included in total per dot line. For purposes of convenience, the description here is limited to only 16 nozzles out of the nozzles included in the nozzle arrays N1 and N2, namely nozzles 12a-12p and 12a'-12p' corresponding to dot lines L1-L16. In practice, however, a larger number of nozzles are arrayed in the direction perpendicular to the conveyance direction of the recording paper P.

The nozzle arrays N1 and N2 are sequentially used to form an image on the recording paper P, which is a recording medium. While the recording paper P is conveyed in the conveyance direction of the recording paper P, the ink is ejected from the nozzle array N1 (as indicated by a solid arrow in the figure) to form the dot line D1, which is a line extending in the width direction of the recording paper P (lateral direction of the figure). Subsequently, the next line, namely the dot line D2, is formed with the ink ejected from the nozzle array N2 (as indicated by a dashed arrow). Further, the next line, namely the dot line D3, is formed with the ink ejected again from the nozzle array N1. Thereafter, the dot line D4 and subsequent dot lines are formed by alternately using the nozzle arrays N1 and N2.

The image forming method according to the second embodiment described above can ensure good ejection of the ink from an inkjet head for a long period of time and also ensure formation of images having a desired density. For this reason, the image forming method according to the second embodiment is favorably applicable to various inkjet recording apparatuses.

EXAMPLES

The following now describes the present disclosure in greater details by way of examples. The present disclosure is not limited to the scope of the examples.

Manufacturing Example 1

Manufacture of Styrene-Acrylic Resins a-f

An oligomer in which a (meth)acryloyl group is bonded at one molecular end of polystyrene (AS-6 manufactured by Toagosei Co., Ltd., the number average molecular weight (Mn) 6,000) is polymerized with a predetermined amount of methacrylic acid, methyl methacrylate, and butyl acrylate in methyl ethyl ketone in the presence of a polymerization initiator (2,2'-azobis(2,4-dimethylvaleronitrile)).

For example, a styrene-acrylic resin having an acid value of 100 can be synthesized in the following manner. A stirrer, a nitrogen inlet tube, a condenser, and a dropping funnel were placed into a four-necked flask having a capacity of 1000 ml. Into the flask, 100 g of isopropyl alcohol and 300 g of methyl ethyl ketone were added, followed by heating to reflux with nitrogen gas being bubbled. Then, a dissolved mixture of 40 g of methyl methacrylate, 40 g of styrene, 10 g of butyl acrylate, 10 g of methacrylic acid, and 0.4 g of azobisisobutyronitrile (AIBN) as a polymerization initiator was placed into the dropping funnel and the mixture was left to drip for about two hours while being heated to reflux at 70° C. After the dripping, the mixture was heated to reflux for another 6 hours and a methyl ethyl ketone solution containing 0.2 g of AIBN was dripped for 15 minutes. Thereafter, the mixture was heated to reflux for another 5 hours to obtain a styrene-acrylic resin having a mass average molecular weight of 20,000. The mass average molecular weight (Mw) of the resulting styrene-acrylic resin was confirmed by a gel filtration chromatography ("HLC-8020GPC" manufactured by Tosoh Corporation) under the following conditions. The acid value of the resulting resin was confirmed to be 100 mgKOH/g by titration. Further, the styrene-acrylic resins a-f each having a corresponding mass average molecular weight (Mw) shown in Table 1 were produced by changing the amount of use of the polymerization initiator in a range of 0.001 mol to 5 mol with respect to 1 mol of the monomer mixture, the polymerization temperature in a range of 50° C. to 70° C., and the polymerization time within a range up to 24 hours.

The mass average molecular weight (Mw) of each resulting styrene-acrylic resin was confirmed by a gel filtration chromatography ("HLC-8020GPC" manufactured by Tosoh Corporation) under the following conditions.

<Measurement Conditions for Mass Average Molecular Weight>

Columns: TSK gel, Super Multipore HZ-H (manufactured by Tosoh Corporation, ID of 4.6 mm×15 cm)

Number of columns: 3
Eluent: tetrahydrofuran
Flow rate: 0.35 ml/min
Sample amount: 10 μl
Measurement temperature: 40° C.
Detector: IR detector For calibration curves, eight types of standard samples, namely F-40, F-20, F-4, F-1, A-5000, A-2500, A-1000, and n-propylbenzene, were selected from standard samples ("TSK standard, polystyrene" manufactured by Tosoh Corporation) and the calibration curves were prepared.

The acid values of the resulting styrene-acrylic resins a-f were all confirmed to be 100 mgKOH/g or so by titration.

TABLE 1

| Styrene-acrylic resin | Mass average molecular weight (Mw) |
|---|---|
| a | 8,000 |
| b | 10,000 |
| c | 20,000 |
| d | 30,000 |
| e | 40,000 |
| f | 45,000 |

Pigment dispersions used in examples and comparative examples were produced by using, as the pigments, the following carbon blacks a-f manufactured by Orion Engineered Carbons Co., Ltd. and each having the DBP oil absorption and the specific surface shown in Table 2.

the remaining percentage by mass of water (ion-exchange water). Subsequently, a potassium hydroxide was added to Dyno Mill in an amount required to neutralize the styrene-acrylic resin. Then, Dyno Mill was filled with 0.5 mm diameter zirconia beads as a media so as to occupy 70% of the vessel capacity, and the pigment and the styrene-acrylic resin were kneaded, while being cooled by water, at 10° C. and at the circumferential velocity of 8 m/s to obtain the pigment dispersion. The styrene-acrylic resin c was neutralized with a NaOH aqueous solution which amounts to 105% of the neutralization equivalent. The mass of Na was regarded to mean the mass of the resin, and the mass of water contained in the NaOH aqueous solution and the mass of water yielded by the neutralization reaction were together regarded to mean the mass of the ion-exchange water. The resulting pigment dispersion was diluted to 300 times with ion-exchange water, and the mean volume diameter $D_{50}$ of the pigment was measured by a dynamic light scattering-type particle size distribution analyzer (Zetasizer Nano, manufactured by Sysmex Co.). The mean volume diameter of the pigment was confirmed to be in a range of 70 nm to 130 nm. The composition of the pigment dispersion thus prepared corresponds to C, which will be described later.

[Preparation of Ink]

Inks of Examples 1-4 and Comparative Examples 1 and 2 were prepared by using the pigment dispersion thus obtained. As the surfactant, a surfactant 10 that is a compound expressed by the following formula (10) was used.

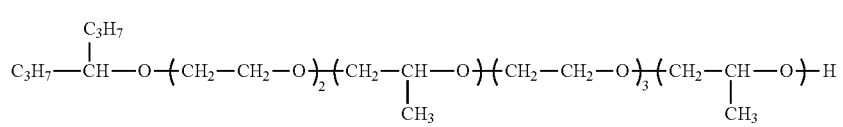

(10)

Carbon Black a: Printex 140U
Carbon Black b: Printex 35
Carbon Black c: Printex 85
Carbon Black d: Printex 95
Carbon Black e: Printex 300
Carbon Black f: Printex G

TABLE 2

| Carbon black | DBP oil absorption [g/100 g] | Specific surface [m²/g] |
|---|---|---|
| a | 34 | 90 |
| b | 42 | 65 |
| c | 46 | 200 |
| d | 52 | 250 |
| e | 72 | 60 |
| f | 90 | 30 |

Examples 1-4 and Comparative Examples 1 and 2

Manufacture of Pigment Dispersion

Relative to the total mass of the materials used to prepare each pigment dispersion, 15% by mass of the respective carbon blacks shown in Table 3 were charged into Dyno Mill (Multilabo having a vessel capacity of 0.6 L and manufactured by Shinmaru Enterprises Corporation) together with 6.0% by mass of the styrene-acrylic resin c manufactured in Manufacture Example 1, 0.2% by mass of 1,2-octanediol, and The materials of the composition 1 below were agitated to be uniformly mixed using an agitator (Three-One Motor, BL-600, manufactured by AS ONE Co.) at the rotational speed of 400 rpm. Thereafter, the resulting mixture was filtered by a filter with a pore size of 5 μm to obtain the inks of Examples 1-4 and Comparative Examples 1 and 2.

(Composition 1)
Pigment dispersion: 40% by mass
Triethylene glycol monobutyl ether: 4.5% by mass
2-pyrrolidone (solution stabilizer): 5.0% by mass
Surfactant 10: 0.2% by mass
1,2-octanediol: 0.6% by mass
Glycerin: 15% by mass
1,3-propanediol: 15% by mass
Ion-exchange water: remaining percentage by mass <<Physical Property Measurement>>

By the following method, the obtained inks of Examples 1-4 and Comparative Examples 1 and 2 were measured for the dried-by-evaporation viscosity ($V_{40}$), which is the viscosity of each ink at the dryness of 40% by mass, and the dynamic surface tension. The measurement results on the dried-by-evaporation viscosity ($V_{40}$) and dynamic surface tension of the inks of Examples 1-4 and Comparative Examples 1 and 2 are shown in Table 3.

<Method for Measuring Dried-by-Evaporation Viscosity ($V_{40}$)>

(Measurement of Dryness by Mass)

About 30 g (W1) of the ink to be measured was placed in a cylindrical container having an opening at the top. Next, the container with the ink is placed in a constant temperature bath set to 60° C. to measure the mass of the contained ink $W_2$ at the time intervals of an optional length. For each measurement of $W_2$, the dryness of the ink by mass is calculated using the following equation.

Dryness by Mass (%)=(($W_1-W_2$)/$W_1$)×100

(Measurement of Viscosity Increase)

The dried-by-evaporation viscosity ($V_{40}$) of the ink was measured when the dryness of the ink reached 40% by mass. $V_{40}$ was measured at 25° C. with an oscillation-type viscometer (Viscomate series VM-10A manufactured by Sekonic cooperation).

<Method for Measuring Dynamic Surface Tension>

The surface tension of each ink at the lifetime in a range of 10 msec to 1000 msec was measured with a bubble pressure dynamic surface tensiometer (BP-100 manufactured by Sanyo Trading Co., Ltd.), and the value measured when the surface lifetime was 10 msec was regarded to mean the dynamic surface tension of the ink.

<<Evaluation>>

By the method below, the inks of Examples 1 to 4 and Comparative Examples 1 and 2 were evaluated for the image density of formed images and the successive ejection. Table 3 below shows the evaluation results of the inks of Examples 1 to 4 and Comparative Examples 1 and 2, with respect to the image density of formed images and the successive ejection.

<Method for Evaluating Image Density>

The image density was evaluated by using, as an evaluating apparatus, an image forming apparatus (linehead-mounted inkjet recording apparatus, a testing machine manufactured by KYOCERA Document Solutions Inc.) under an environment of 25° C. and 50% RH. Regular paper (A4-size PPC C2 manufactured by Fuji Xerox Co., Ltd.) was used as a recording medium, and the settings were made so as to eject 11 pL (per pixel) of the ink from the recording head toward the recording medium, and a solid image of 10 cm×10 cm was formed. The image density of the image thus formed was measured at ten locations by using a portable reflection densitometer RD-19 (manufactured by Gretag Machbeth AG), and the average of the image densities thus measured was regarded to mean the image density of the solid image. The image densities were evaluated by the following criterion.

Good: Image density of 1.10 or higher
Poor: Image density of less than 1.10

<Method for Evaluating Successive Ejection>

The evaluations of the successive ejection were made in an environment of 25° C. and 50% RH by using the same set of the image forming apparatus and the recording medium used for the evaluations of the image densities. The ink is loaded into the recording head and a series of operation involving a purge (ejection of the ink) and a wipe (cleaning of the ink by wiping) was carried out three times. The amount of ink purged per time by one recording head was set to 2 cc. Thereafter, the line images (the width of one dot×the width of the recording medium) perpendicular to the forwarding direction of the recording medium were formed continuously for 60 minutes at spaced intervals of the one-dot width. The images were formed by regulating the amount of ink ejected from one nozzle of the recording head per pixel to 11 pL. The successive ejection was judged according to the following criterion.

Good: Neither non-ejection of the ink nor deviation of landing positions of the ink (10 μm or more from the expected line) was observed.

Poor: Non-ejection of the ink or deviation of landing positions of the ink (10 μm or more from the expected line) was observed.

TABLE 3

|  | Comparative example 1 | Example 1 | Example 2 | Example 3 | Example 4 | Comparative example 2 |
|---|---|---|---|---|---|---|
| Pigment dispersion |  |  |  |  |  |  |
| Pigment dispersion composition |  |  |  |  |  |  |
| Composition | C | C | C | C | C | C |
| Resin-to-carbon black ratio [mass %] | 40 | 40 | 40 | 40 | 40 | 40 |
| Carbon black |  |  |  |  |  |  |
| Type | a | b | c | d | e | f |
| DBP oil absorption [g/100 g] | 34 | 42 | 46 | 52 | 72 | 90 |
| Styrene-acrylic resin |  |  |  |  |  |  |
| Type | c | c | c | c | c | c |
| Mass average molecular weight | 20000 | 20000 | 20000 | 20000 | 20000 | 20000 |
| Type of surfactant | 10 | 10 | 10 | 10 | 10 | 10 |
| Physical properties of ink |  |  |  |  |  |  |
| Dried-by-evaporation viscosity ($V_{40}$) [mPa·s] | 25.9 | 36.4 | 38.2 | 40.1 | 44.5 | 60.1 |
| Dynamic surface tension [mN/m] | 46 | 45 | 46 | 46 | 47 | 49 |
| Evaluation |  |  |  |  |  |  |
| Density evaluation |  |  |  |  |  |  |
| Image density | 1.01 | 1.11 | 1.15 | 1.20 | 1.23 | 1.28 |
| Judgment | poor | good | good | good | good | good |
| Evaluation of successive ejection | good | good | good | good | good | poor |

Table 3 reveals that use of the inks of Examples 1-4 (each of which contains water, the pigment dispersion containing the resin and carbon black, and the surfactant containing a compound expressed by the formula (I), and each satisfies that the mass average molecular weight of the resin, the DBP oil absorption of the carbon black, the content of the resin with respect to the content of the carbon black in the pigment dispersion, and the dried-by-evaporation viscosity $V_{40}$, which is the viscosity of the ink at the dryness of 40% by mass, all fall within the predetermined ranges) can ensure good ejection of the ink from the inkjet head for a long period of time, while ensuring formation of images having a desired density.

Comparative Example 1 reveals that use of an ink prepared by using the pigment dispersion containing, as the pigment, carbon black having an extremely low DBP oil absorption makes it difficult to form images having a desired density. This is assumed to be because the carbon black does not readily absorb the resin and thus is not dispersed well in the ink.

Comparative Example 2 reveals that use of an ink prepared by using the pigment dispersion containing, as the pigment, carbon black having an extremely high DBP oil absorption makes it difficult to ensure good ejection of the ink from an inkjet head for a long period of time. This is assumed to be because the adsorption of the resin by the carbon black is too strong, which tends to result in excessive increase in the viscosity of the ink.

Examples 5-8 and Comparative Examples 3 and 4

Manufacture of Pigment Dispersion

The pigment dispersions were obtained basically in the same manner as Example 1, except that the carbon black c was used as the pigment and that the styrene-acrylic resins listed in Table 4 below were used to prepare the respective pigment dispersions.

[Preparation of Ink]

Inks of Examples 5-8 and Comparative Examples 3 and 4 were prepared in the same manner as Example 1, by using the pigment dispersions thus obtained.

The obtained inks of Examples 5-8 and Comparative Examples 3 and 4 were measured for the dried-by-evaporation viscosity ($V_{40}$) and dynamic surface tension. The inks of Examples 5-8 and Comparative Examples 3 and 4 were also evaluated for the image density of formed images and the successive ejection. Table 4 shows the measurement results of the dried-by-evaporation viscosity ($V_{40}$) and the dynamic surface tension as well as the evaluation results of the image density of formed images and the successive ejection.

TABLE 4

|  | Comparative example 3 | Example 5 | Example 6 | Example 7 | Example 8 | Comparative example 4 |
| --- | --- | --- | --- | --- | --- | --- |
| Pigment dispersion |  |  |  |  |  |  |
| Pigment dispersion composition |  |  |  |  |  |  |
| Composition | C | C | C | C | C | C |
| Resin-to-carbon black ratio [% by mass] | 40 | 40 | 40 | 40 | 40 | 40 |
| Carbon black |  |  |  |  |  |  |
| Type | c | c | c | c | c | c |
| DBP oil absorption [g/100 g] | 46 | 46 | 46 | 46 | 46 | 46 |
| Styrene-acrylic resin |  |  |  |  |  |  |
| Type | a | b | c | d | e | f |
| Mass average molecular weight | 8,000 | 10,000 | 20,000 | 30,000 | 40,000 | 45,000 |
| Type of surfactant | 10 | 10 | 10 | 10 | 10 | 10 |
| Physical properties of ink |  |  |  |  |  |  |
| Dried-by-evaporation viscosity ($V_{40}$) [mPa · s] | 32.5 | 36.4 | 38.2 | 44.3 | 48.5 | 52.5 |
| Dynamic surface tension [mN/m] | 46 | 47 | 46 | 45 | 46 | 48 |
| Evaluation |  |  |  |  |  |  |
| Density evaluation |  |  |  |  |  |  |
| Image density | 1.08 | 1.12 | 1.15 | 1.16 | 1.18 | 1.20 |
| Judgment | poor | good | good | good | good | good |
| Evaluation of successive ejection | good | good | good | good | good | poor |

Table 4 reveals that use of the inks of Examples 5-8 (each of which contains water, the pigment dispersion containing the resin and the carbon black, the surfactant including a compound expressed by the formula (I), and each of which satisfies that the mass average molecular weight of the resin, the DBP oil absorption of the carbon black, the content of the resin with respect to the content of the carbon black in the pigment dispersion, and the dried-by-evaporation viscosity $V_{40}$, which is the viscosity of the ink at the dryness of 40% by mass, all fall within the predetermined ranges) can ensure good ejection of the ink from an inkjet head for a long period of time, while ensuring formation of images having a desired density.

Comparative Example 3 reveals that an ink prepared by using the pigment dispersion containing a resin having an extremely low mass average molecular weight makes it difficult to form images having a desired density. This is assumed to be because the wettability of the ink to the recording medium is too high so that the pigment particles cannot readily remain on the recording medium.

Comparative Example 4 reveals that an ink prepared by using the pigment dispersion containing a resin having an extremely high mass average molecular weight makes it difficult to ensure good ejection of the ink from an inkjet head for a long period of time. This is assumed to be because the viscosity of the ink tends to be excessively high as the ink dries.

Comparative Examples 5-10

Manufacture of Pigment Dispersion

Pigment dispersions were manufactured in the same manner as Example 1, except that the carbon black a was used as the pigment and that the amount of the resin with respect to the carbon black in each pigment dispersion corresponded to the pigment dispersion compositions A-F shown in Table 5.

TABLE 5

| Pigment dispersion composition | Amount of resin [mass %] | Amount of resin with respect to carbon black [% by mass] |
|---|---|---|
| A | 3.75 | 25 |
| B | 4.50 | 30 |
| C | 6.00 | 40 |
| D | 7.50 | 50 |
| E | 9.00 | 60 |
| F | 9.75 | 65 |

[Preparation of Ink]

Inks of Comparative Examples 5-10 were obtained in the same manner as the ink of Example 1, except that the pigment dispersions of compositions A-F were used.

Comparative Examples 5-10 thus obtained were measured for the dried-by-evaporation viscosity ($V_{40}$) and the dynamic surface tension. The inks of Comparative Examples 5-10 thus obtained were also evaluated for the image density of formed images and the successive ejection. Table 6 shows the measurement results of the dried-by-evaporation viscosity ($V_{40}$) and the dynamic surface tension as well as the evaluation results of the density of formed images and the successive ejection.

TABLE 6

| | Comparative example 5 | Comparative example 6 | Comparative example 7 | Comparative example 8 | Comparative example 9 | Comparative example 10 |
|---|---|---|---|---|---|---|
| Pigment dispersion | | | | | | |
| Pigment dispersion composition | | | | | | |
| Composition | A | B | C | D | E | F |
| Resin-to-carbon black ratio [Mass %] | 25 | 30 | 40 | 50 | 60 | 65 |
| Carbon black | | | | | | |
| Type | a | a | a | a | a | a |
| DBP oil absorption [g/100 g] | 34 | 34 | 34 | 34 | 34 | 34 |
| Styrene-acrylic resin | | | | | | |
| Type | c | c | c | c | c | c |
| Mass average molecular weight | 20000 | 20000 | 20000 | 20000 | 20000 | 20000 |
| Type of surfactant | 10 | 10 | 10 | 10 | 10 | 10 |
| Physical property measurement | | | | | | |
| Dried-by-evaporation viscosity ($V_{40}$) [mPa · s] | 24.0 | 24.8 | 25.9 | 26.4 | 27.5 | 27.9 |
| Dynamic surface tension [mN/m] | 46 | 47 | 48 | 46 | 47 | 48 |
| Evaluation | | | | | | |
| Evaluation of image density | | | | | | |
| Image density | 0.90 | 0.93 | 0.97 | 1.01 | 1.04 | 1.08 |
| Judgment | poor | poor | poor | poor | poor | poor |
| Evaluation of successive ejection | good | good | good | good | good | good |

Table 6 reveals that use of the inks of Comparative Examples 5-10 (the inks each prepared by using the pigment dispersion containing carbon black having an excessively low DBP oil absorption) makes it difficult to form images having a desired density even if the content of the resin with respect to the carbon black is from 30% by mass to 60% by mass.

Examples 9-12 and Comparative Examples 11 and 12

Manufacture of Pigment Dispersion

Pigment dispersions of the compositions shown in Table 7 below were obtained in the same manner as Example 1, by using the carbon black b as the pigment.

[Preparation of Ink]

Inks of Examples 9-12 and Comparative Examples 11 and 12 were obtained in the same manner as the ink of Example 1, except that the pigment dispersions of the compositions A-F were used.

The obtained inks of Examples 9-12 and Comparative Examples 11 and 12 were measured for the dried-by-evaporation viscosity ($V_{40}$) and dynamic surface tension. The inks of Examples 9-12 and Comparative Examples 11 and 12 were also evaluated for the image density of formed images and the successive ejection. Table 7 shows the measurement results of the dried-by-evaporation viscosity ($V_{40}$) and the dynamic surface tension as well as of the evaluation results of the image density of formed images and the successive ejection.

Table 7 reveals that use of the inks of Examples 9-12 (each of which contains water, the pigment dispersion containing the resin and the carbon black, the surfactant including a compound expressed by the formula (I), and each of which satisfies that the mass average molecular weight of the resin, the DBP oil absorption of the carbon black, the content of the resin with respect to the content of the carbon black in the pigment dispersion, and the dried-by-evaporation viscosity $V_{40}$, which is the viscosity of the ink at the dryness of 40% by mass, all fall within the predetermined ranges) can ensure good ejection of the ink from an inkjet head for a long period of time, while ensuring formation of images having a desired density.

Comparative Example 11 reveals that use of an ink prepared by using a pigment dispersion in which the content ratio of the carbon black to the resin is excessively low makes it difficult to form images having a desired density. This is assumed to be because the content of the resin with respect to the content of the carbon black is too low to allow the carbon black to be dispersed well in the ink.

Comparative Example 12 reveals that use of an ink prepared by using a pigment dispersion in which the content ratio of the resin to the carbon black is excessively high makes it difficult to ensure good ejection of the ink from an inkjet head for a long period of time. This is assumed to be because the viscosity of the ink tends to be excessively high as the ink dries.

TABLE 7

|  | Comparative example 11 | Example 9 | Example 10 | Example 11 | Example 12 | Comparative example 12 |
|---|---|---|---|---|---|---|
| Pigment dispersion |  |  |  |  |  |  |
| Pigment dispersion composition |  |  |  |  |  |  |
| Composition | A | B | C | D | E | F |
| Resin-to-carbon black ratio [Mass %] | 25 | 30 | 40 | 50 | 60 | 65 |
| Carbon black |  |  |  |  |  |  |
| Type | b | b | b | b | b | b |
| DBP oil absorption [g/100 g] | 42 | 42 | 42 | 42 | 42 | 42 |
| Styrene-acrylic resin |  |  |  |  |  |  |
| Type | c | c | c | c | c | c |
| Mass average molecular weight | 20000 | 20000 | 20000 | 20000 | 20000 | 20000 |
| Type of surfactant | 10 | 10 | 10 | 10 | 10 | 10 |
| Physical property measurement |  |  |  |  |  |  |
| Dried-by-evaporation viscosity ($V_{40}$) [mPa · s] | 30.5 | 33.5 | 36.4 | 43.5 | 47.5 | 50.3 |
| Dynamic surface tension [mN/m] | 47 | 46 | 47 | 47 | 48 | 47 |
| Evaluation |  |  |  |  |  |  |
| Evaluation of image density |  |  |  |  |  |  |
| Image density | 1.08 | 1.12 | 1.15 | 1.17 | 1.19 | 1.20 |
| Judgment | poor | good | good | good | good | good |
| Evaluation of successive ejection | good | good | good | good | good | poor |

Examples 13-15 and Comparative Examples 13-15

Manufacture of Pigment Dispersion

Pigment dispersions of the respective compositions shown in Table 8 below were obtained in the same manner as Example 1, by using the carbon black e as the pigment.

[Preparation of Ink]

Inks of Examples 13-15 and Comparative Examples 13-15 were prepared in the same manner as Example 1, by using the pigment dispersions of the compositions A-F thus obtained.

The obtained inks of Examples 13-15 and Comparative Examples 13-15 were measured for the dried-by-evaporation viscosity ($V_{40}$) and dynamic surface tension. The inks of Examples 13-15 and Comparative Examples 13-15 were also evaluated for the image density of formed images and the successive ejection. Table 8 shows the measurement results of the dried-by-evaporation viscosity ($V_{40}$) and the dynamic surface tension as well as the evaluation results of the image density of formed images and the successive ejection.

Comparative Example 14 reveals that use of an ink having a dried-by-evaporation viscosity $V_{40}$ exceeding 50 mN/m makes it difficult to ensure good ejection of the ink from an inkjet head for a long period of time, even if the content of the resin with respect to the content of the carbon black is from 30% by mass to 60% by mass. This is assumed to be because an ink having such a dried-by-evaporation viscosity has a tendency that the viscosity of the ink tends to be excessively high as the ink dries.

Comparative Example 13 reveals that use of an ink prepared by using a pigment dispersion in which the content of the resin with respect to the content of the carbon black is too low makes it difficult to form images having a desired density. This is assumed to be because the content of the resin with respect to the content of the carbon black is too low to allow the carbon black to be dispersed well in the ink.

Comparative Example 15 reveals that use of an ink prepared by using a pigment dispersion in which the content of the resin with respect to the content of the carbon black is excessively high makes it difficult to ensure good ejection of

TABLE 8

| | Comparative example 13 | Example 13 | Example 14 | Example 15 | Comparative example 14 | Comparative example 15 |
|---|---|---|---|---|---|---|
| Pigment dispersion | | | | | | |
| Pigment dispersion composition | | | | | | |
| Composition | A | B | C | D | E | F |
| Resin-to-carbon black ratio [mass %] | 25 | 30 | 40 | 50 | 60 | 65 |
| Carbon black | | | | | | |
| Type | e | e | e | e | e | e |
| DBP oil absorption [g/100 g] | 72 | 72 | 72 | 72 | 72 | 72 |
| Styrene-acrylic resin | | | | | | |
| Type | c | c | c | c | c | c |
| Mass average molecular weight | 20000 | 20000 | 20000 | 20000 | 20000 | 20000 |
| Type of surfactant | 10 | 10 | 10 | 10 | 10 | 10 |
| Physical property measurement | | | | | | |
| Dried-by-evaporation viscosity ($V_{40}$) [mPa·s] | 32.4 | 40.6 | 44.5 | 48.5 | 51.2 | 59.4 |
| Dynamic surface tension [mN/m] | 46 | 47 | 48 | 47 | 47 | 46 |
| Evaluation | | | | | | |
| Evaluation of image density | | | | | | |
| Image density | 1.09 | 1.15 | 1.12 | 1.16 | 1.20 | 1.21 |
| Judgment | poor | good | good | good | good | good |
| Evaluation of successive ejection | good | good | good | good | poor | poor |

Table 8 reveals that use of the inks of Examples 13-15 (each of which contains water, the pigment dispersion containing the resin and the carbon black, and the surfactant including a compound expressed by the formula (I), and each of which satisfies that the mass average molecular weight of the resin, the DBP oil absorption of the carbon black, the content of the resin with respect to the content of the carbon black in the pigment dispersion, and the dried-by-evaporation viscosity $V_{40}$, which is the viscosity of the ink at the dryness of 40% by mass, all fall within the predetermined ranges) can ensure good ejection of the ink from the inkjet head for a long period of time, while ensuring formation of images having a desired density.

the ink from an inkjet head for a long period of time. This is assumed to be because the viscosity of the ink tends to be excessively high as the ink dries.

Comparative Examples 16-21

Manufacture of Pigment Dispersion

Pigment dispersions of the respective compositions shown in Table 9 below were obtained in the same manner as Example 1, by using the carbon black f as the pigment.

[Preparation of Ink]

Inks of Comparative Examples 16-21 were obtained in the same manner as the ink of Example 1, except that the thus obtained pigment dispersions of the compositions A-F were used.

The inks of Comparative Examples 16-21 thus obtained were measured for the dried-by-evaporation viscosity ($V_{40}$) and the dynamic surface tension. The inks of Comparative Examples 16-21 were also evaluated for the image density of the formed images and the successive ejection. Table 9 shows the measurement results of the dried-by-evaporation viscosity ($V_{40}$) and the dynamic surface tension as well as the evaluation results of the image density of formed images and the successive ejection.

TABLE 9

|  | Comparative example 16 | Comparative example 17 | Comparative example 18 | Comparative example 19 | Comparative example 20 | Comparative example 21 |
|---|---|---|---|---|---|---|
| Pigment dispersion |  |  |  |  |  |  |
| Pigment dispersion composition |  |  |  |  |  |  |
| Composition | A | B | C | D | E | F |
| Resin-to-carbon black ratio [mass %] | 25 | 30 | 40 | 50 | 60 | 65 |
| Carbon black |  |  |  |  |  |  |
| Type | f | f | f | f | f | f |
| DBP oil absorption [g/100 g] | 90 | 90 | 90 | 90 | 90 | 90 |
| Styrene-acrylic resin |  |  |  |  |  |  |
| Type | c | c | c | c | c | c |
| Mass Average molecular weight | 20000 | 20000 | 20000 | 20000 | 20000 | 20000 |
| Type of surfactant | 10 | 10 | 10 | 10 | 10 | 10 |
| Physical property measurement |  |  |  |  |  |  |
| Dried-by-evaporation viscosity ($V_{40}$) [mPa·s] | 50.2 | 53.2 | 57.4 | 60.1 | 64.5 | 69.0 |
| Dynamic surface tension [mN/m] | 47 | 47 | 46 | 48 | 47 | 46 |
| Evaluation |  |  |  |  |  |  |
| Evaluation of image density |  |  |  |  |  |  |
| Image density | 1.13 | 1.17 | 1.21 | 1.28 | 1.18 | 1.24 |
| Judgment | good | good | good | good | good | good |
| Evaluation of successive ejection | poor | poor | poor | poor | poor | poor |

Table 9 reveals that use of an ink prepared by using a pigment dispersion containing, as the pigment, carbon black having an excessively high DBP oil absorption makes it difficult to ensure good ejection of the ink form an inkjet head for a long period of time, even if the content of the resin with respect to the content of the carbon black is from 30% by mass to 60% by mass.

Examples 16-18 and Comparative Examples 22-24

Manufacture of Pigment Dispersion

Pigment dispersions of the compositions shown in Table 10 below were obtained in the same manner as Example 1, by using the carbon black e as the pigment.

[Preparation of Ink]

Inks of Example 16-18 and Comparative Examples 22-24 were prepared in the same manner as Example 1, by using the pigment dispersions of Compositions A-F, except that the surfactant used is a surfactant 14 that is a compound expressed by a formula (14) below, instead of the surfactant 10 that is a compound expressed by the formula (10).

[Formula 5]

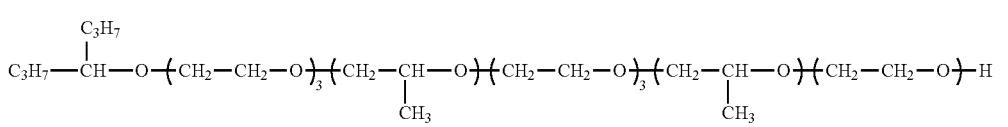

(14)

The obtained inks of Examples 16-18 and Comparative Examples 22-24 were measured for the dried-by-evaporation viscosity ($V_{40}$) and the dynamic surface tension. The inks of Examples 16-18 and Comparative Examples 22-24 were also evaluated for the image density of formed images and the successive ejection. Table 10 shows the measurement results of the dried-by-evaporation viscosity ($V_{40}$) and the dynamic surface tension and the evaluation results of the image density of formed images and the successive ejection.

low makes it difficult to form images having a desired density. This is assumed to be because the content of the resin with respect to the content of the carbon black is too low to allow the carbon black to be dispersed well in the ink.

Comparative Example 24 reveals that use of an ink prepared by using a pigment dispersion in which the content of

TABLE 10

| | Comparative example 22 | Example 16 | Example 17 | Example 18 | Comparative example 23 | Comparative example 24 |
|---|---|---|---|---|---|---|
| Pigment dispersion | | | | | | |
| Pigment dispersion composition | | | | | | |
| Composition | A | B | C | D | E | F |
| Resin-to-carbon black ratio [mass %] | 25 | 30 | 40 | 50 | 60 | 65 |
| Carbon black | | | | | | |
| Type | e | e | e | e | e | e |
| DBP oil absorption [g/100 g] | 72 | 72 | 72 | 72 | 72 | 72 |
| Styrene-acrylic resin | | | | | | |
| Type | c | c | c | c | c | c |
| Mass Average molecular weight | 20000 | 20000 | 20000 | 20000 | 20000 | 20000 |
| Type of surfactant | 14 | 14 | 14 | 14 | 14 | 14 |
| Physical property measurement | | | | | | |
| Dried-by-evaporation viscosity ($V_{40}$) [mPa · s] | 36.8 | 40.6 | 42.1 | 44.3 | 50.6 | 55.4 |
| Dynamic surface tension [mN/m] | 49 | 46 | 47 | 46 | 47 | 47 |
| Evaluation | | | | | | |
| Evaluation of image density | | | | | | |
| Image density | 1.07 | 1.11 | 1.13 | 1.16 | 1.19 | 1.12 |
| Judgment | poor | good | good | good | good | good |
| Evaluation of successive ejection | good | good | good | good | poor | poor |

Table 10 reveals that use of the inks of Examples 16-18 (each of which contains water, the pigment dispersion containing the resin and the carbon black, the surfactant including a compound expressed by the formula (I), and each of which satisfies that the mass average molecular weight of the resin, the DBP oil absorption of the carbon black, the content of the resin with respect to the content of the carbon black in the pigment dispersion, and the dried-by-evaporation viscosity $V_{40}$, which is the viscosity of the ink at the dryness of 40% by mass, all fall within the predetermined ranges) can ensure good ejection of the ink from an inkjet head for a long period of time, while ensuring formation of images having a desired density.

Comparative Example 23 reveals that use of an ink having a dried-by-evaporation viscosity $V_{40}$ exceeding 50 mN/m makes it difficult to ensure good ejection of the ink from an inkjet head for a long period of time, even if the content of the resin with respect to the content of the carbon black is from 30% by mass to 60% by mass. This is assumed to be because an ink having such a dried-by-evaporation viscosity has a tendency that the viscosity excessively increases as the ink dries.

Comparative Example 22 reveals that use of an ink prepared by using a pigment dispersion in which the content of the resin with respect to the content of the carbon black is too the resin with respect to the content of the carbon black is excessively high makes it difficult to ensure good ejection of the ink from an inkjet head for a long period of time. This is assumed to be because the viscosity of the ink tends to be excessively high as the ink dries.

Examples 19-25 and Comparative Examples 25-37

As Examples 19-25 and Comparative Examples 25-37, inks were prepared respectively by using: surfactants 1-15 (compounds expressed by the following formulas (1)-(15)); a surfactant 16 (Surfynol 440, a surfactant manufactured by Nissin Chemical Industry Co., Ltd); and surfactants 17-20 (compounds expressed by the following formulas (17)-(20)).

Each of the surfactants 1-15 and 17-20 is a compound in which ethylene oxide and/or propylene oxide is added to alkanol. Tables 11-15 below show the respective surfactants with respect to: the carbon number and structure of an alkyl group derived from alkanol; and the addition number n of ethylene oxide and the addition number m of propylene oxide in one molecule of the surfactant. In the case where the alkyl group derived from alkanol is a branched-chain alkyl group, Tables 11-15 show the values corresponding to A+B appearing in the formula (I) expressing the compound.

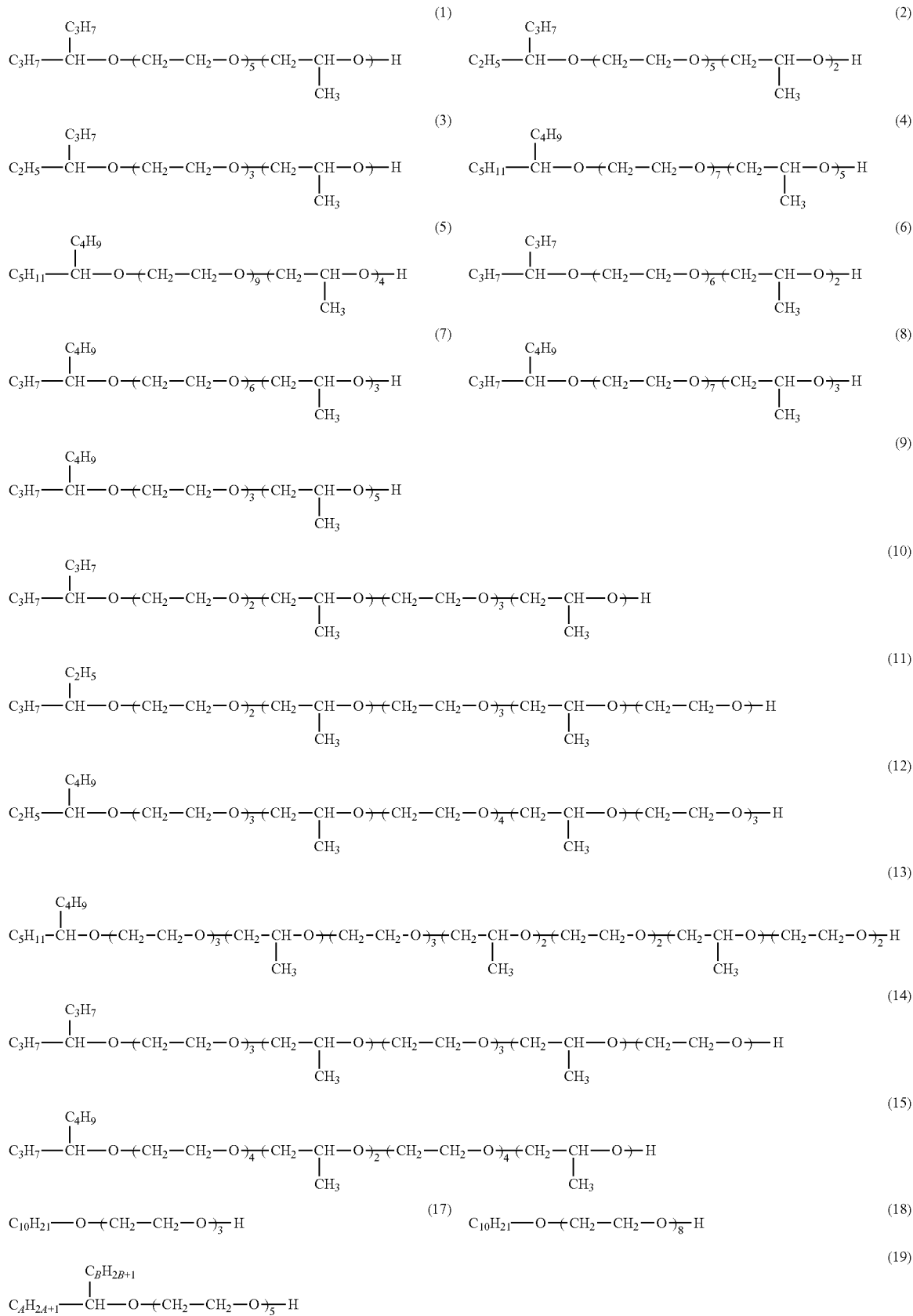

(where A and B each represents an integer equal to 1 or larger, and A+B is equal to 12.)

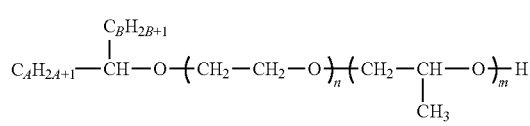

(20)

(where A and B each represents an integer equal to 1 or larger, A+B is from 11 to 12, n is equal to 7, and m is from 2 to 3.)

[Preparation of Ink]

Inks of Examples 19-25 and Comparative Examples 25-37 were prepared in the same manner as the ink of Example 2, except that the respective surfactants used are those shown in Tables 11-15 below.

The obtained inks of Examples 19-25 and Comparative Examples 25-37 were measured for the dried-by-evaporation viscosity ($V_{40}$) and dynamic surface tension. The inks of Examples 19-25 and Comparative Examples 25-37 were also evaluated for the image density of formed images and the successive ejection. Tables 11-15 show the measurement results of the dried-by-evaporation viscosity ($V_{40}$) and the dynamic surface tension as well as the evaluation results of the image density of formed images and the successive ejection.

TABLE 11

|  | Example 19 | Comparative example 25 | Comparative example 26 | Comparative example 27 |
|---|---|---|---|---|
| Type of surfactant | | | | |
| Type | 1 | 2 | 3 | 4 |
| Alkyl group structure | branched-chain | branched-chain | branched-chain | branched-chain |
| Alkyl group carbon number | 7 | 6 | 6 | 10 |
| A + B | 6 | 5 | 5 | 9 |
| n | 5 | 5 | 3 | 7 |
| m | 1 | 2 | 1 | 5 |
| n + m | 6 | 7 | 4 | 12 |
| Dried-by-evaporation viscosity ($V_{40}$) [mN/m] Physical property measurement | 38.3 | 37.6 | 37.9 | 38.5 |
| Dried-by-evaporation viscosity ($V_{40}$) [mPa · s] | 38.3 | 37.6 | 37.9 | 38.5 |
| Dynamic surface tension [mN/m] Evaluation Evaluation of image density | 47 | 49 | 50 | 43 |
| Image density | 1.12 | 1.08 | 1.06 | 1.16 |
| Judgment | good | poor | poor | good |
| Evaluation of successive ejection | good | good | good | poor |

TABLE 12

|  | Comparative example 28 | Example 20 | Example 21 | Example 22 | Comparative example 29 |
|---|---|---|---|---|---|
| Type of surfactant | | | | | |
| Type | 5 | 6 | 7 | 8 | 9 |
| Alkyl group structure | branched-chain | branched-chain | branched-chain | branched-chain | branched-chain |
| Alkyl group carbon number | 10 | 7 | 8 | 8 | 8 |
| A + B | 9 | 6 | 7 | 7 | 7 |
| n | 9 | 6 | 6 | 7 | 3 |
| m | 4 | 2 | 3 | 3 | 5 |
| n + m | 13 | 8 | 9 | 10 | 8 |
| Physical property measurement | | | | | |
| Dried-by-evaporation viscosity ($V_{40}$) [mPa · s] | 39.2 | 38.6 | 39.1 | 38.2 | 43.0 |
| Dynamic surface tension [mN/m] Evaluation Evaluation of image density | 41 | 48 | 47 | 45 | 38 |
| Image density | 1.18 | 1.11 | 1.13 | 1.14 | 1.08 |
| Judgment | good | good | good | good | poor |
| Evaluation of successive ejection | poor | good | good | good | poor |

TABLE 13

|  | Example 23 | Comparative example 30 | Comparative example 31 |
|---|---|---|---|
| Type of surfactant |  |  |  |
| Type | 10 | 11 | 12 |
| Alkyl group structure | branched-chain | branched-chain | branched-chain |
| Alkyl group carbon number | 7 | 6 | 7 |
| A + B | 6 | 5 | 6 |
| n | 5 | 6 | 10 |
| m | 2 | 2 | 2 |
| n + m | 7 | 8 | 12 |
| Physical property measurement |  |  |  |
| Dried-by-evaporation viscosity ($V_{40}$) [mPa·s] | 37.4 | 37.8 | 37.4 |
| Dynamic surface tension [mN/m] | 49 | 52 | 42 |

TABLE 13-continued

|  | Example 23 | Comparative example 30 | Comparative example 31 |
|---|---|---|---|
| Evaluation |  |  |  |
| Evaluation of image density |  |  |  |
| Image density | 1.15 | 1.09 | 1.17 |
| Judgment | good | poor | good |
| Evaluation of successive ejection | good | good | poor |

TABLE 14

|  | Comparative example 32 | Example 24 | Example 25 |
|---|---|---|---|
| Type of surfactant |  |  |  |
| Type | 13 | 14 | 15 |
| Alkyl group structure | branched-chain | branched-chain | branched-chain |
| Alkyl group carbon number | 10 | 7 | 8 |
| A + B | 9 | 6 | 7 |
| n | 10 | 7 | 8 |
| m | 4 | 2 | 3 |
| n + m | 14 | 9 | 11 |
| Physical property measurement |  |  |  |
| Dried-by-evaporation viscosity ($V_{40}$) [mPa·s] | 37.4 | 37.1 | 37.5 |
| Dynamic surface tension [mN/m] | 41 | 47 | 45 |
| Evaluation |  |  |  |
| Evaluation of image density |  |  |  |
| Image density | 1.19 | 1.14 | 1.13 |
| Judgment | good | good | good |
| Evaluation of successive ejection | poor | good | good |

TABLE 15

|  | Comparative example 33 | Comparative example 34 | Comparative example 35 | Comparative example 36 | Comparative example 37 |
|---|---|---|---|---|---|
| Type of surfactant |  |  |  |  |  |
| Type | 16 | 17 | 18 | 19 | 20 |
| Alkyl group structure | — | straight-chain | straight-chain | branched-chain | branched-chain |
| Alkyl group carbon number | — | 10 | 10 | 13 | 12-13 |
| A + B | — | — | — | 12 | 11-12 |
| n | — | 3 | 8 | 5 | 7 |
| m | — | 0 | 0 | 0 | 2-3 |
| n + m | — | 3 | 8 | 5 | 9-10 |
| Physical property measurement |  |  |  |  |  |
| Dried-by-evaporation viscosity ($V_{40}$) [mPa·s] | 40.3 | 38.2 | 38.1 | 36.4 | 38.5 |
| Dynamic surface tension [mN/m] | 39 | 38 | 43 | 49 | 41 |
| Evaluation |  |  |  |  |  |
| Evaluation of image density |  |  |  |  |  |
| Image density | 1.13 | 1.12 | 1.08 | 1.08 | 1.10 |
| Judgment | good | good | poor | poor | good |
| Evaluation of successive ejection | poor | poor | poor | good | poor |

Tables 11-15 reveal that use of the inks of Examples 19-25 (each of which contains water, the pigment dispersion containing the resin and the carbon black, the surfactant including a compound expressed by the formula (I), and each of which satisfies that the mass average molecular weight of the resin, the DBP oil absorption of the carbon black, the content of the resin with respect to the content of the carbon black in the pigment dispersion, and the dried-by-evaporation viscosity $V_{40}$, which is the viscosity of the ink at the dryness of 40% by mass, all fall within the predetermined ranges) can ensure good ejection of the ink from an inkjet head for a long period of time, while ensuring formation of images having a desired density.

Comparative Examples 25, 26, and 30 reveal the following. That is, when the ink containing the surfactant 2 or 11 including the compound where A+B is less than 6 is used and also when the ink containing the surfactant 3 including the compound where A+B is less than 6 and n+m is less than 5 is used, it may be difficult to form images having a desired density.

This is assumed to be because the wettability of each ink to a recording medium is poor so that the ink is slow to diffusion or permeate into the recording medium.

Comparative Examples 27, 28, 31, and 32 reveal the following. That is, when the ink containing the surfactant 4, 5, 12 or 13 including the compound where n+m exceeds 11 is used, it may be difficult to ensure good ejection of the ink from an inkjet head for a long period of time. This is assumed to be because an ink containing a surfactant having such a structure has a tendency that the viscosity excessively increases as the ink dries.

Comparative Example 29 reveals the following. That is, when the ink containing the surfactant 9 including the compound where n≤m is satisfied is used, it may be difficult to form images having a desired density and to ensure good ejection of the ink from an inkjet head. This is assumed to be because the wettability of such an ink to a recording medium is too high so that the pigment contained in the ink permeates into the recording medium together with water and the organic solvent.

Examples 26-33

Preparation of Ink

Inks of Examples 26-28 were each prepared in the same manner as the ink of Example 2, except that the surfactant 7 was used in an amount shown in Table 16 below. Inks of Examples 29-33 were each prepared in the same manner as the ink of Example 2, except that the surfactant 10 was used in an amount shown in Table 17 below.

The inks of Examples 26-33 thus obtained were measured for the dried-by-evaporation viscosity ($V_{40}$) and dynamic surface tension. The inks of Examples 26-33 thus obtained were also evaluated for the image density of formed images and the successive ejection. Tables 16 and 17 show the measurement results of the dried-by-evaporation viscosity ($V_{40}$) and the dynamic surface tension as well as the evaluation results of the image density of formed images and the successive ejection.

TABLE 16

|  | Example 26 | Example 27 | Example 28 |
|---|---|---|---|
| Content of surfactant 7 [mass %] | 0.05 | 0.20 | 0.50 |
| Physical property measurement |  |  |  |
| Dried-by-evaporation viscosity ($V_{40}$) [mPa · s] | 38.6 | 39.1 | 39.2 |
| Dynamic surface tension [mN/m] | 48 | 46 | 45 |
| Evaluation |  |  |  |
| Evaluation of image density |  |  |  |
| Image density | 1.11 | 1.13 | 1.16 |
| Judgment | good | good | good |
| Evaluation of successive ejection | good | good | good |

TABLE 17

|  | Example 29 | Example 30 | Example 31 | Example 32 | Example 33 |
|---|---|---|---|---|---|
| Content of surfactant 10 [mass %] | 0.03 | 0.05 | 0.10 | 0.30 | 0.50 |
| Physical property measurement |  |  |  |  |  |
| Dried-by-evaporation viscosity ($V_{40}$) [mPa · s] | 36.8 | 37.1 | 37.4 | 37.6 | 37.8 |
| Dynamic surface tension [mN/m] | 48 | 46 | 47 | 48 | 47 |
| Evaluation |  |  |  |  |  |
| Evaluation of image density |  |  |  |  |  |
| Image density | 1.10 | 1.13 | 1.16 | 1.18 | 1.20 |
| Judgment | good | good | good | good | good |
| Evaluation of successive ejection | good | good | good | good | good |

Tables 16 and 17 reveal that use of the inks of Examples 26-33 (each of which contains water, the pigment dispersion containing the resin and the carbon black, the surfactant including a compound expressed by the formula (I), and each of which satisfies that the mass average molecular weight of the resin, the DBP oil absorption of the carbon black, the content of the resin with respect to the content of the carbon black in the pigment dispersion, and the dried-by-evaporation viscosity V40, which is the viscosity of the ink at the dryness of 40% by mass, all fall within the predetermined ranges) can ensure good ejection of the ink from an inkjet head for a long period of time, while ensuring formation of images having a desired density.

The invention claimed is:

1. An ink for inkjet recording apparatuses, comprising:
water; a pigment dispersion; and a surfactant including a compound expressed by the general formula (I) below,
wherein the pigment dispersion includes a resin and carbon black,
a mass average molecular weight of the resin is from 10,000 to 40,000,
a DBP oil absorption of the carbon black is from 40 g/100 g to 80 g/100 g, a content of the resin in the pigment dispersion is from 30% by mass to 60% by mass with respect to a content of the carbon black, a dried-by-evaporation viscosity of the ink is 50 mPa·s or less, the dried-by-evaporation viscosity defining a viscosity of the ink at a dryness of 40% by mass,

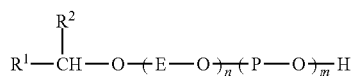
(I)

wherein in the general formula (I),
$R^1$ represents $C_AH_{2A+1}$,
$R^2$ represents $C_BH_{2B+1}$,
A and B each represent an integer 1 or larger,
A+B represents an integer from 6 to 10,
-E-O— represents —$CH_2CH_2$—O—,
—P—O— represents —$CH_2CH(CH_3)$—O—,
n and m each represents a positive number,
n+m represents a number from 5 to 11,
n>m is satisfied, and
a repetitive sequence of (-E-O—) and (—P—O—) is either a random sequence or a block sequence.

2. An ink for inkjet recording apparatuses according to claim 1, wherein
a content of the surfactant is from 0.05% by mass to 0.5% by mass with respect to a total mass of the ink.

3. An ink for inkjet recording apparatuses according to claim 1, wherein
a content of the carbon black is from 4% by mass to 8% by mass with respect to the total mass of the ink.

4. An ink for inkjet recording apparatuses according to claim 1, further comprising:
glycerin; and
1,3-propanediol.

5. An image forming method for forming an image by an inkjet recording apparatuses by using an ink for inkjet recording apparatuses according to claim 1.

6. An image forming method according to claim 5, wherein the image is formed without heating a recording medium.

7. An image forming method according to claim 5, wherein the inkjet recording apparatus is of a linehead recording type.

* * * * *